US010583522B2

(12) United States Patent
Abedraboh et al.

(10) Patent No.: US 10,583,522 B2
(45) Date of Patent: Mar. 10, 2020

(54) TOOLS FOR USE IN CONFINED SPACES

(71) Applicant: Hubbell Incorporated, Shelton, CT (US)

(72) Inventors: Mamoon Tawfiq Abedraboh, Tulsa, OK (US); Richard Wallace Ceass, Tulsa, OK (US); Louis Webster Ruffin, Tulsa, OK (US); Adam Britton Polcha, Tulsa, OK (US)

(73) Assignee: HUBBELL INCORPORATED, Shelton, CT (US)

( * ) Notice: Subject to any disclaimer, the term of this patent is extended or adjusted under 35 U.S.C. 154(b) by 340 days.

(21) Appl. No.: 15/613,078

(22) Filed: Jun. 2, 2017

(65) Prior Publication Data

US 2017/0348795 A1 Dec. 7, 2017

Related U.S. Application Data

(60) Provisional application No. 62/345,112, filed on Jun. 3, 2016.

(51) Int. Cl.
| *B23K 20/00* | (2006.01) |
| *B23K 20/16* | (2006.01) |
| *B23K 20/26* | (2006.01) |
| *B23K 37/06* | (2006.01) |
| *B25G 1/04* | (2006.01) |
| *B23K 101/06* | (2006.01) |

(52) U.S. Cl.
CPC ............ *B23K 20/165* (2013.01); *B23K 20/26* (2013.01); *B23K 37/06* (2013.01); *B25G 1/04* (2013.01); *B23K 2101/06* (2018.08)

(58) Field of Classification Search
CPC ...... B23K 23/00; B23K 20/165; B23K 37/06; B23K 1/0006; B23K 20/26; B23K 2101/06; B23K 2101/10; B23K 2101/32; B23K 35/02; B23K 35/0255; B23K 35/0261; B23K 37/04
See application file for complete search history.

(56) References Cited

U.S. PATENT DOCUMENTS

| 4,062,485 A | 12/1977 | Andersen |
| 4,157,598 A | 6/1979 | Talent et al. |
| 4,879,452 A | 11/1989 | Kovarik et al. |

(Continued)

FOREIGN PATENT DOCUMENTS

WO 2013140010 9/2013

OTHER PUBLICATIONS

International Search Report and Written Opinion mailed in corresponding PCT Application PCT/US0217/035842 dated Aug. 16, 2017.

(Continued)

*Primary Examiner* — Erin B Saad
(74) *Attorney, Agent, or Firm* — Wissing Miller LLP

(57) ABSTRACT

A tool assembly for performing operations in confined spaces, the tool assembly includes a telescoping pole having a proximal end and a distal end. The telescoping pole is capable of extending between a retracted position and an extended position. A working tool is connected to the distal end of the telescoping pole, and a control unit is connected to the proximal end of the telescoping pole. A flexible cable extending through the telescoping pole electrically connects the working tool to the control unit.

4 Claims, 33 Drawing Sheets

(56) References Cited

U.S. PATENT DOCUMENTS

| | | | |
|---|---|---|---|
| 4,885,452 A | 12/1989 | Amos et al. | |
| 5,145,106 A | 9/1992 | Moore et al. | |
| 5,660,317 A | 8/1997 | Singer et al. | |
| 5,715,886 A | 2/1998 | Fuchs | |
| 5,829,510 A | 11/1998 | Fuchs | |
| 6,553,911 B1 | 4/2003 | Walker et al. | |
| 6,663,476 B1 | 12/2003 | Story et al. | |
| 6,776,386 B1 | 8/2004 | Morrissey et al. | |
| 6,994,244 B2 | 2/2006 | Harger et al. | |
| 7,152,328 B2 | 12/2006 | Champlin | |
| 7,240,717 B2 | 7/2007 | Lofton | |
| 7,946,466 B1 | 5/2011 | Lofton | |
| 7,975,900 B2 | 7/2011 | Lofton et al. | |
| 8,060,257 B2 | 11/2011 | Close et al. | |
| 8,065,938 B1 | 11/2011 | Kravitch | |
| 8,074,864 B2 | 12/2011 | Lofton et al. | |
| D666,976 S | 9/2012 | Gassner | |
| 8,424,424 B1 | 4/2013 | Kravitch | |
| 8,733,215 B1 | 5/2014 | Kravitch | |
| 8,915,675 B1 | 12/2014 | Smith | |
| 9,216,323 B2 | 12/2015 | Schwartz | |
| 9,399,265 B2 | 7/2016 | Duart Ivarez Cienfuegos | |
| 9,591,809 B2* | 3/2017 | Gieske | A01G 3/086 |
| 10,129,508 B1* | 11/2018 | Hillman | H04N 7/185 |
| 2002/0104953 A1 | 8/2002 | Triantopoulos et al. | |
| 2003/0116693 A1 | 6/2003 | Hantusch et al. | |
| 2003/0221578 A1 | 12/2003 | Forman et al. | |
| 2006/0158549 A1 | 7/2006 | Digweed et al. | |
| 2007/0017955 A1 | 1/2007 | Siracki et al. | |
| 2009/0173873 A1 | 7/2009 | Stidham et al. | |
| 2010/0163607 A1 | 7/2010 | Viseur et al. | |
| 2011/0132296 A1 | 6/2011 | Lofton | |
| 2011/0132967 A1 | 6/2011 | Lofton et al. | |
| 2011/0253697 A1 | 10/2011 | Lofton et al. | |
| 2012/0055979 A1 | 3/2012 | Alghusain | |
| 2015/0041520 A1 | 2/2015 | Pomar Garcia et al. | |
| 2015/0328716 A1 | 11/2015 | Duart Lvarez Cienfuegos | |
| 2017/0232551 A1* | 8/2017 | Abedraboh | B23K 23/00 228/18 |
| 2017/0348795 A1* | 12/2017 | Abedraboh | B23K 20/165 |
| 2018/0019526 A1* | 1/2018 | Stilwell | H01R 4/023 |
| 2018/0277285 A1* | 9/2018 | Stilwell | H01B 17/14 |
| 2019/0101288 A1* | 4/2019 | Hoagland | F23Q 1/02 |

OTHER PUBLICATIONS

BurndyWeld QIKLITE (TM) Brochure, 2010.
Aplicaciones Tecnologicas APLIWELD Catalog,(24 Pages), Jun. 2014.
Eritech, Cadweld Exothermic Welding Manual, (40 Pages) 2009.
ThermOweld World Master Catalog , Continental Industries, (324 pages), 2014.

* cited by examiner

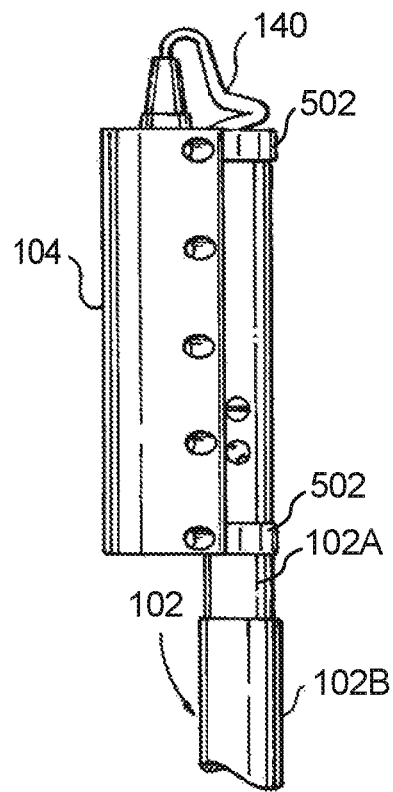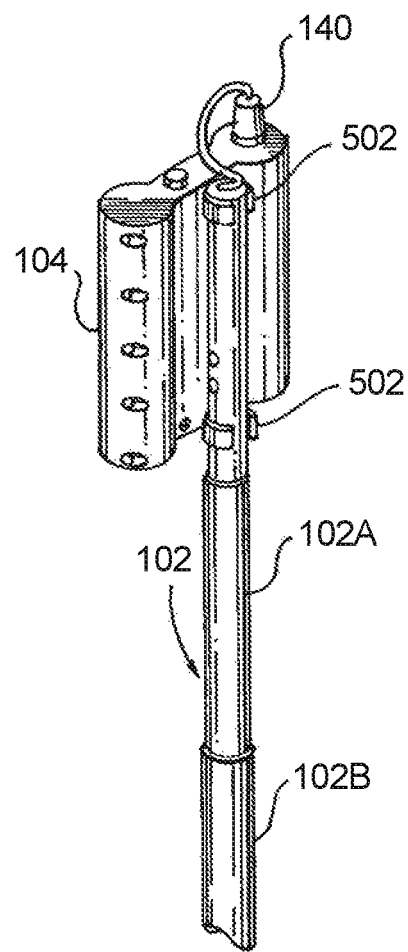
Fig. 4
Fig. 5

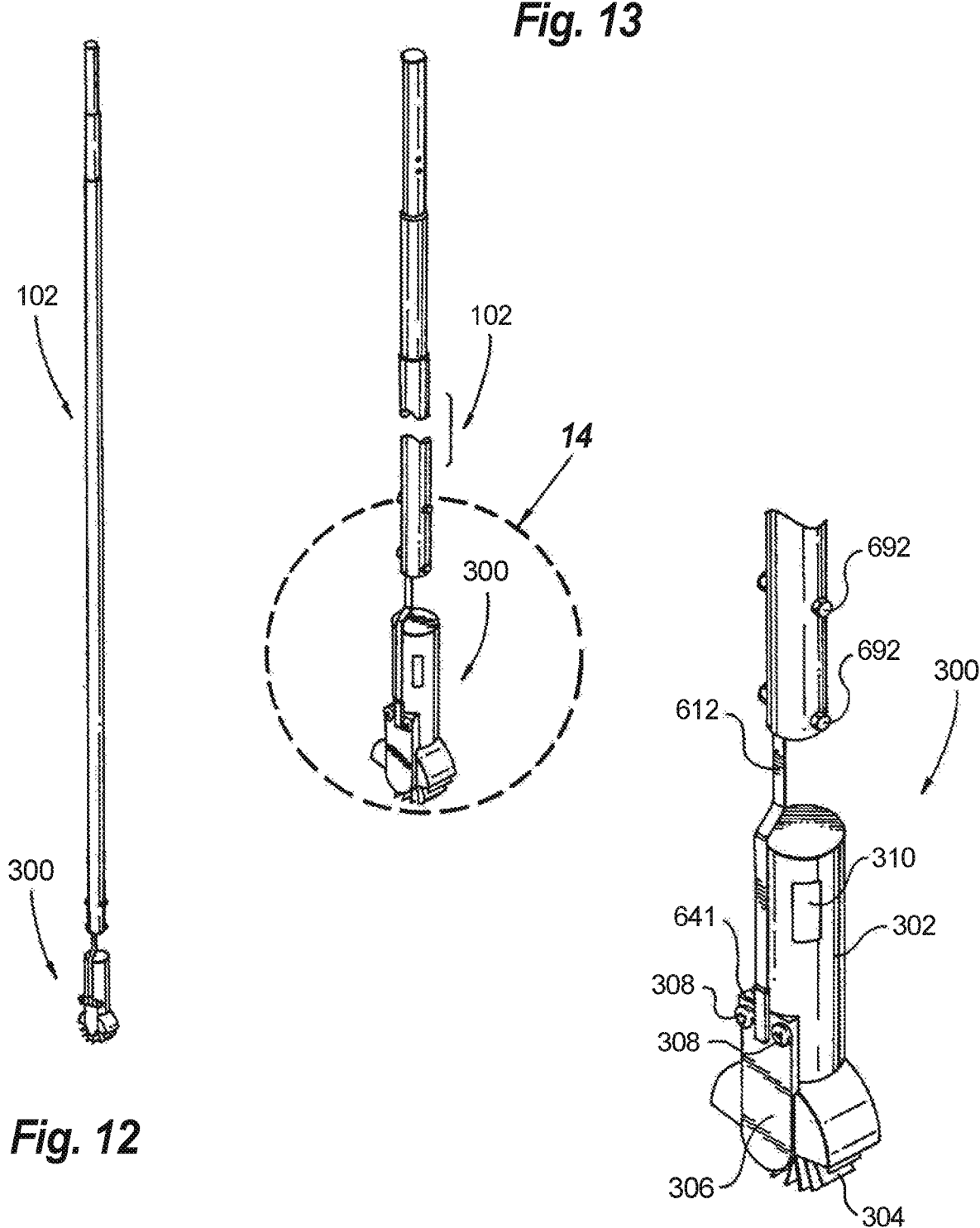

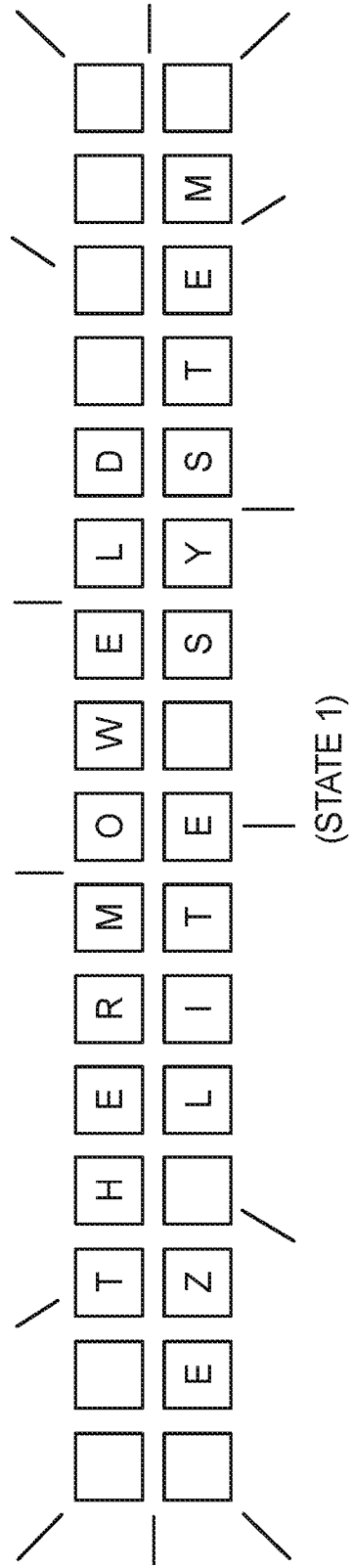
*Fig. 36* (STATE 1)
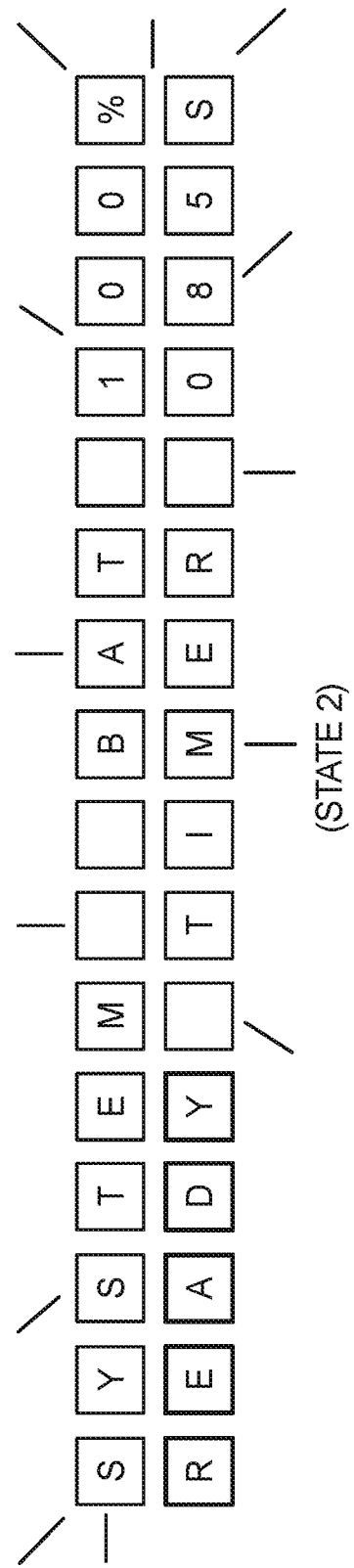
*Fig. 37* (STATE 2)

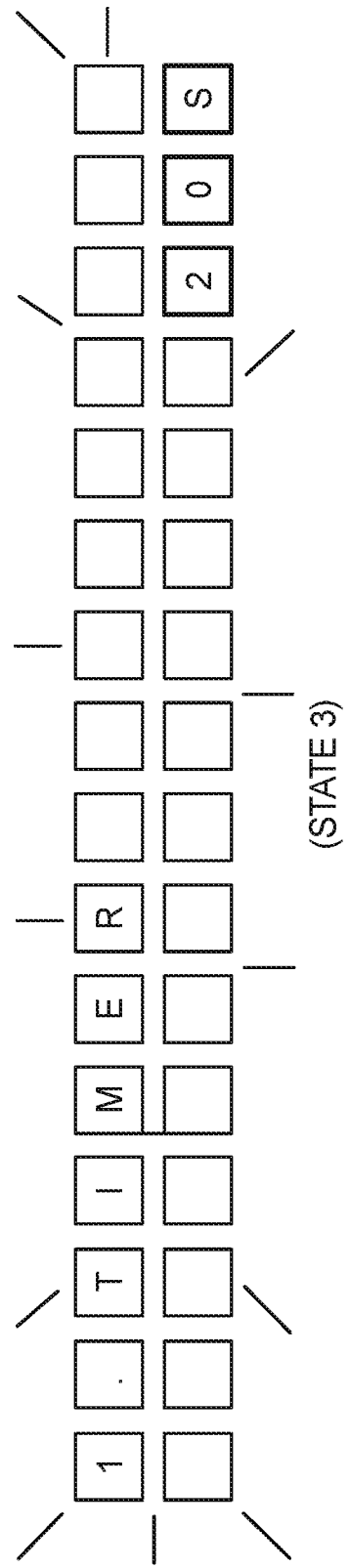
Fig. 38 (STATE 3)
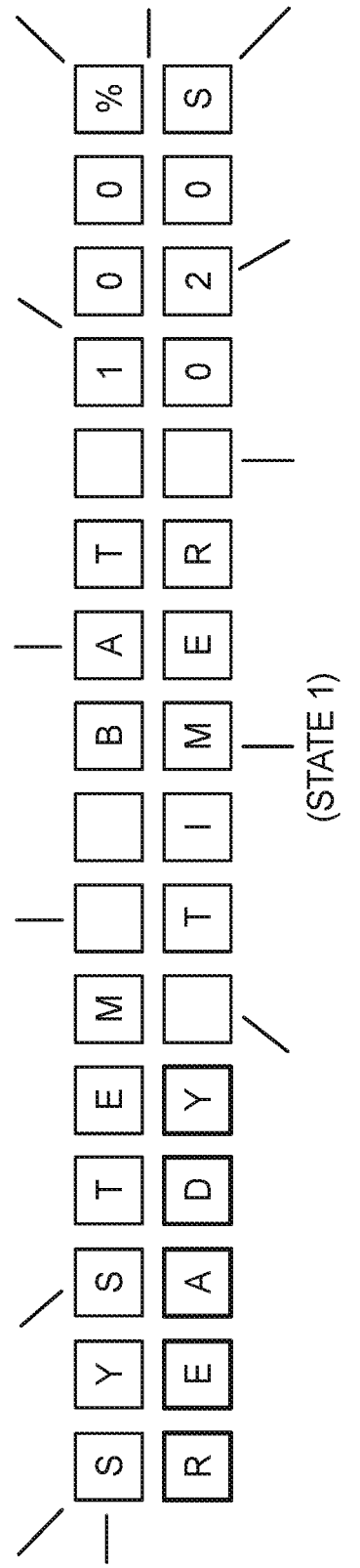
Fig. 39 (STATE 1)

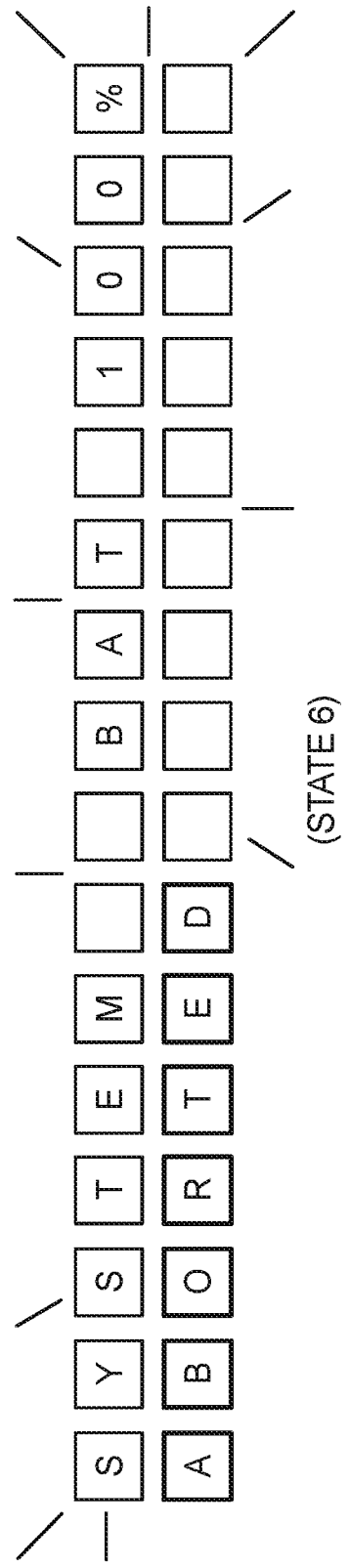
*Fig. 45* (STATE 6)
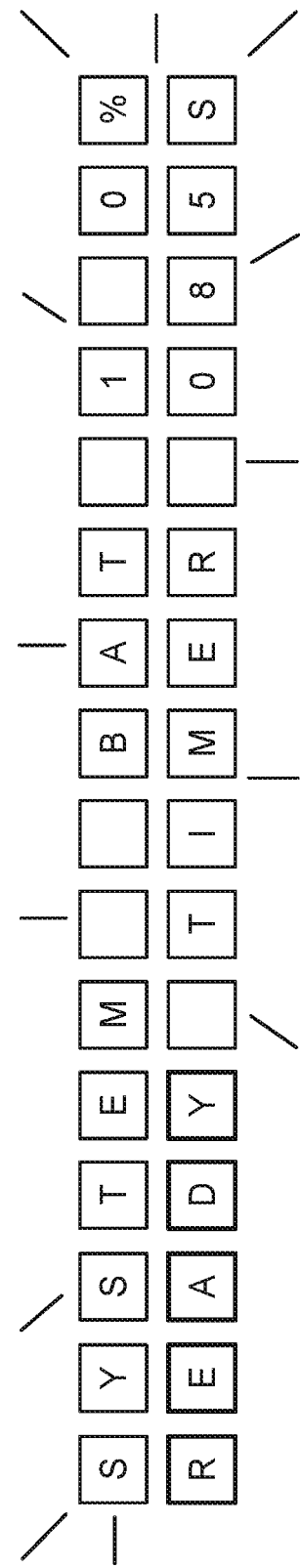
*Fig. 46* (STATE 1)

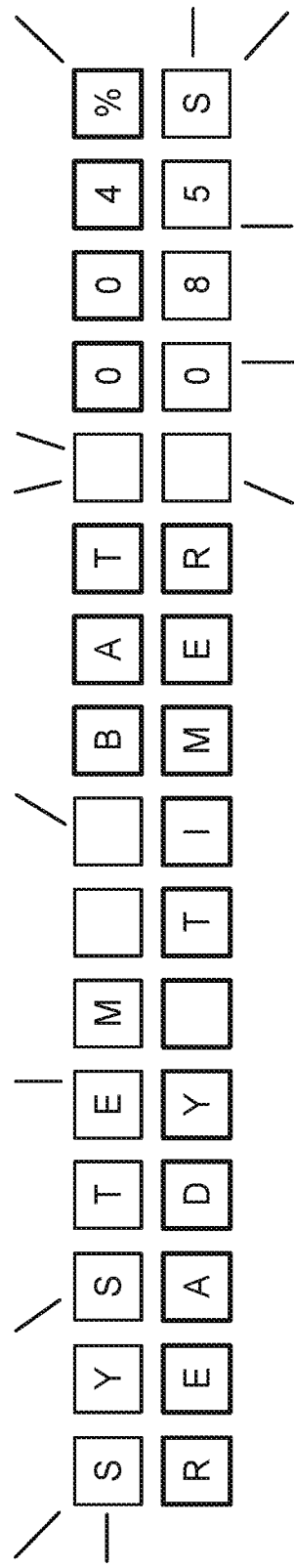
Fig. 47 (STATE 7)
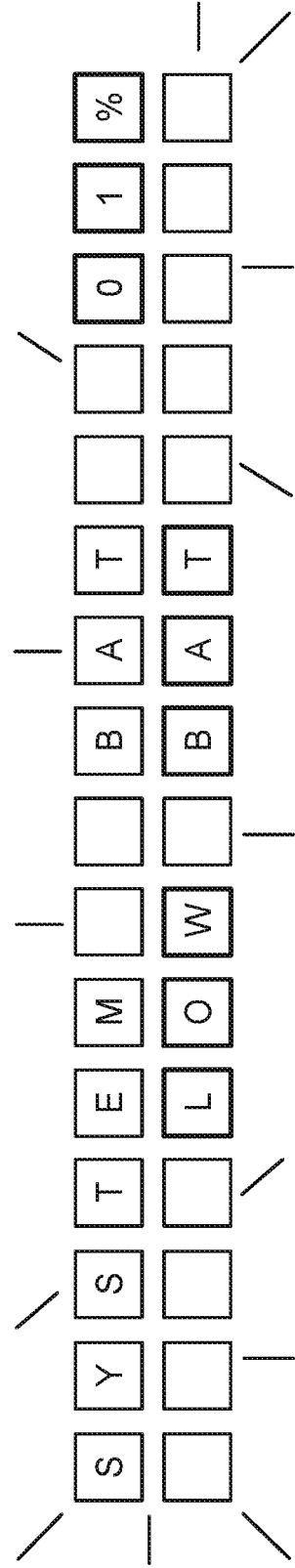
Fig. 48 (STATE 8)

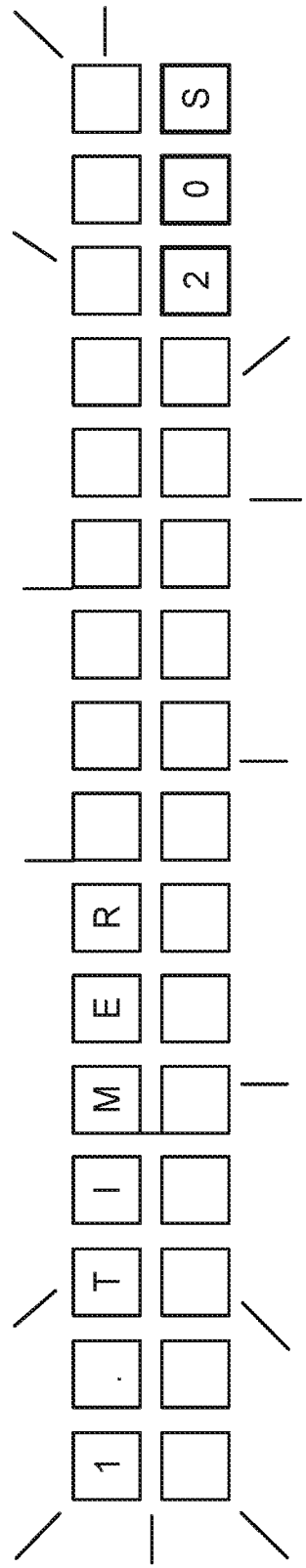
Fig. 49 (STATE 9)
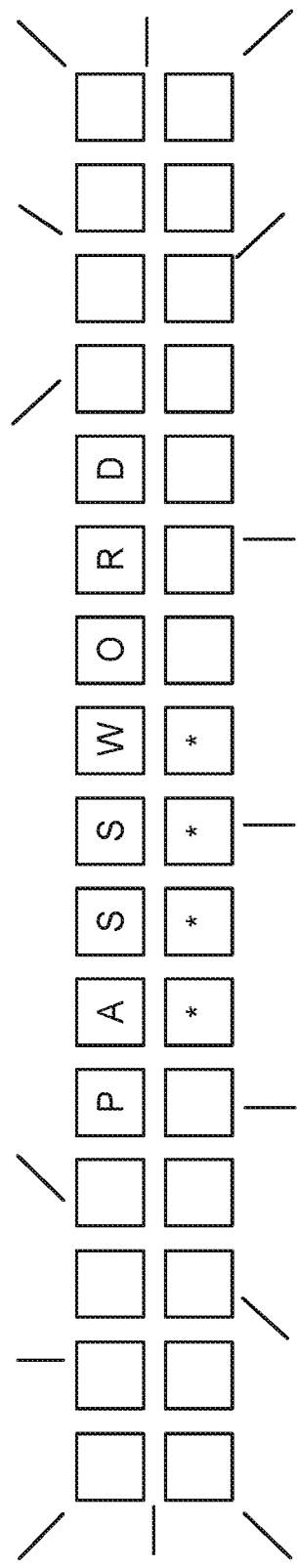
Fig. 50 (STATE 10)

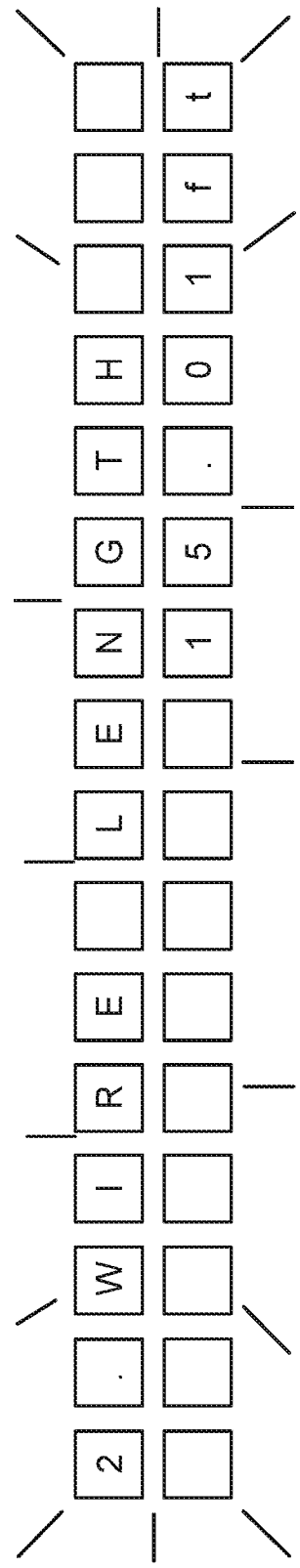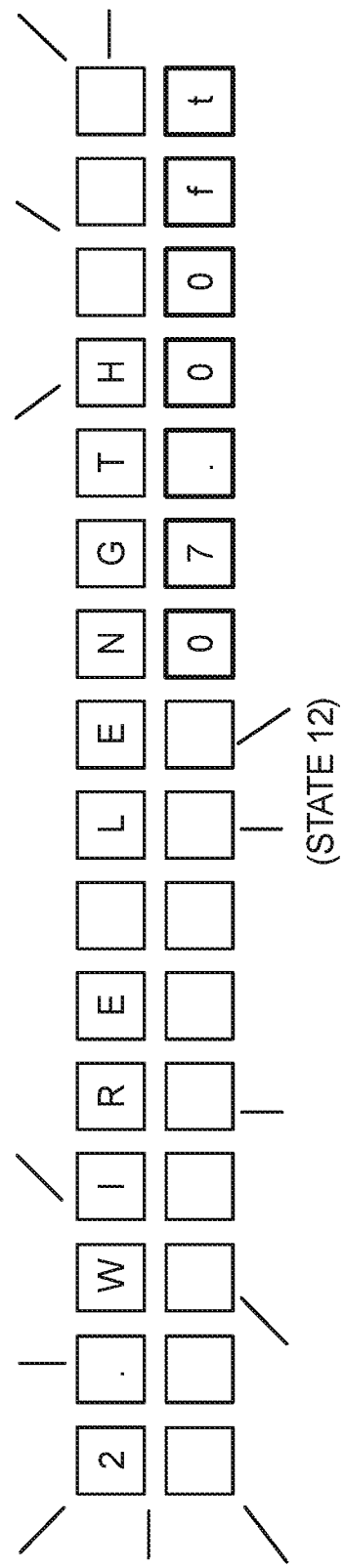

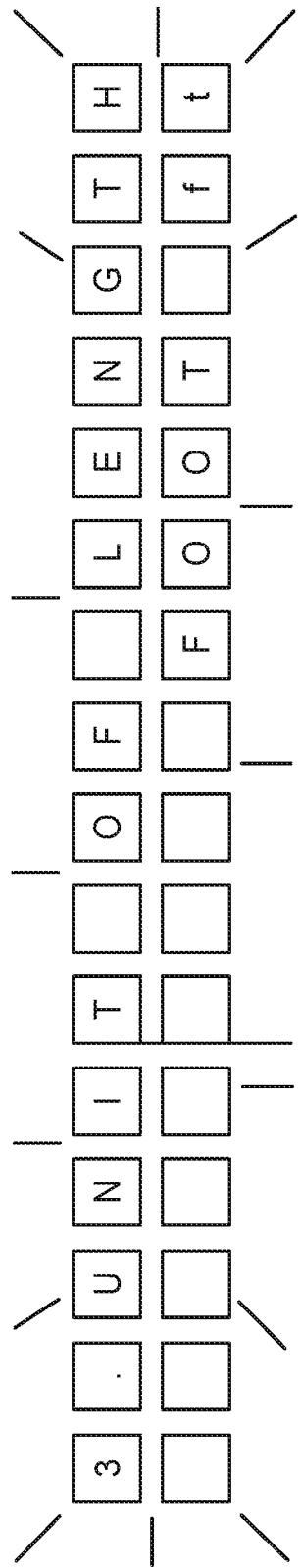
(STATE 13) *Fig. 53*
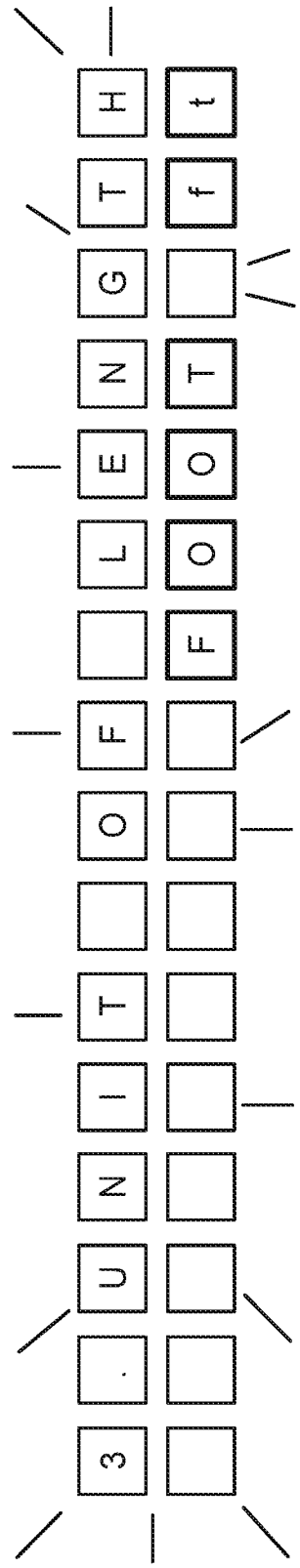
(STATE 14) *Fig. 54*

TOOLS FOR USE IN CONFINED SPACES

CROSS REFERENCE TO RELATED APPLICATIONS

The present application is based on and claims benefit from U.S. Provisional Application Ser. No. 62/345,112 filed Jun. 3, 2016 entitled "Tools, Systems and Methods for Use in Confined Spaces" the entire contents of which are herein incorporated by reference.

BACKGROUND

Field

The present disclosure relates generally to tool assemblies for use in confined spaces. More specifically, the present disclosure relates to tool assemblies having a telescoping pole, a control unit at a proximal end of the pole and a working tool at a distal end of the pole.

Description of the Related Art

Often it is necessary to access underground utilities such as water lines, gas lines, electrical lines, steam lines, etc. In order to minimize the damage occurring above grade, a small work space is often used to access the utility. These work spaces generally include confined areas that have limited ingress and egress which may not allow sufficient room for the workman to traverse. These areas include but are not limited to subterranean excavations often referred to as keyhole excavations. Keyhole excavations provide access to subterranean utilities including pipes, cables, etc. using as small a ground opening as possible. Generally, a small hole (e.g., 18" in diameter or smaller) or a ditch is cut in the ground covering surface material which may include asphalt, cement, grass, etc. Earthen material is then removed from the hole to expose the utility to be worked. Tools often referred to as keyhole tools are then used to perform work on the utility.

The work to be performed on subterranean utilities may include joining parts such as cables, wires, pipes, etc. For example, a cable or wire is sometimes welded to and underground pipe to provide cathodic protection. The cable or wire may be connected to a sacrificial anode, which when electrically connected to a steel or cast iron structure such as pipes, etc., protects the structure from corrosion. Often exothermic reaction welding is used for providing a permanent joint between parts. An exemplary exothermic reaction welding process may involve cleaning a surface of the structure to be welded (e.g., a pipe), positioning a reusable exothermic reaction welding mold on the structure, positioning a cable or wire in position to be welded to the structure, starting the exothermic reaction welding process and removing the mold. The cable or wire may be, for example, copper while the structure is generally steel or cast iron. Accordingly, the process may include a step of providing a coating to the weld site to prevent galvanic corrosion. Because of the limited access provided by keyhole excavations, these processes are performed above-ground by workers utilizing keyhole tools.

Accordingly, a need exists for tools, systems and methods that allow the user to perform work on underground structures having limited accessibility.

SUMMARY

The present disclosure provides tool assemblies for performing operations in confined spaces, such as keyhole excavations and ditches. In one exemplary embodiment, tool assembly includes a telescoping pole, a control unit at a proximal end of the pole and a working tool at a distal end of the pole. The telescoping pole includes a proximal end and a distal end and is capable of extending between a retracted position and an extended position. The working tool is connected at the distal end of the telescoping pole, and the control unit is connected to the proximal end of the telescoping pole. A flexible cable, e.g., a coiled cable, extends through the telescoping pole and electrically connects the control unit to the working device.

In another exemplary embodiment, the tool assembly for performing operations in confined spaces includes a telescoping pole, an exothermic welding assembly and a control unit. The telescoping pole includes a proximal end and a distal end and is capable of extending between a retracted position and an extended position. The exothermic welding assembly is mounted to the distal end of the pole and includes a mold assembly having an upper portion forming a crucible and having an orifice for receiving one end of an ignitor stick, a lower portion having a lower surface for contacting a surface of a structure to be welded, a notch in the lower surface for receiving a cable to be welded to the structure, and a clip positioned in vicinity of the notch for holding the cable during welding. The control unit is connected to the proximal end of the telescoping pole, and a flexible cable extending through the telescoping pole electrically connects the control unit to the weld assembly.

In another exemplary embodiment, the tool assembly for performing operations in confined spaces includes a telescoping pole, a first working tool, a second working tool and a control unit. The telescoping pole includes a proximal end and a distal end and is capable of extending between a retracted position and an extended position. The first working tool is connected at the distal end of the telescoping pole, the second working tool connected at the distal end of the telescoping pole. The control unit is connected to the proximal end of the telescoping pole, and a flexible cable extending through the telescoping pole electrically connects the control unit to at least one of the working tools.

The present disclosure also provides embodiments of an exothermic welding assembly for use in confined spaces. The exothermic welding assembly includes an exothermic mold assembly and an ignitor box. The exothermic mold assembly includes an upper member forming a crucible and having an orifice for receiving one end of an ignitor stick, and a lower member portion having a lower surface for contacting a surface of a structure to be welded, a notch in the lower surface for receiving a cable to be welded to the structure, and a clip positioned in vicinity of the notch for holding the cable during welding. The ignitor box can be electrically connected to another end of the ignitor stick.

The present disclosure also provides methods for performing working operations in confined spaces. In one exemplary embodiment, the method includes attaching a grinding tool to a distal end of a telescoping pole, extending the distal end of the telescoping pole and grinding tool into a confined space, such as a keyhole excavation, and cleaning a surface of a structure, attaching a welding assembly to a distal end of the telescoping pole, preparing the welding assembly for an exothermic weld, positioning a cable with respect to the welding assembly and temporarily attaching the cable to the welding assembly, extending the distal end of the telescoping pole and welding assembly into the confined space and positioning the welding assembly with the attached cable onto the structure, and initiating from a proximal end of the telescoping pole an exothermic reaction in the welding assembly for welding the cable to the structure.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 4 is a side elevation view of the control unit attached to the proximal end of the telescoping pole of FIG. 2 taken from detail 4;

FIG. 5 is a rear perspective view of the control unit attached to the proximal end of the telescoping pole of FIG. 3 taken from detail 5;

FIG. 12 is a perspective view of another exemplary embodiment of tool assembly according to the present disclosure, illustrating a grinding tool as the working tool attached to a distal end of a telescoping pole;

FIG. 13 is a perspective view of the distal end of the tool assembly of FIG. 12;

FIG. 14 is a rear perspective view of the grinding tool of FIG. 13 taken from detail 14;

FIGS. 36-54 are various display states displayed to a user according to illustrative embodiments of the present disclosure.

DETAILED DESCRIPTION

Exemplary embodiments of the tool assembly according to the present disclosure provide a telescoping pole capable of having one or more working tools attached to a distal end of the pole that can be lowered into the confined space using the pole. To activate the working tool remote from the working site, a control unit may be removably mounted to the proximal end of the pole. According to an exemplary embodiment, the working tool can be an exothermic reaction mold assembly which is removably attached to the distal end of the pole. The exothermic reaction mold assembly includes may include a pipe magnet, a mold assembly and an ignition box. In such an embodiment, the control unit is an ignitor unit utilized to activate the ignition box to initiate an exothermic reaction inside the mold. According to an exemplary embodiment, the ignitor unit can be connected to the exothermic reaction mold assembly utilizing a coiled cable having memory. The coiled cable can be routed within the pole or it can be external to the pole. In another exemplary embodiment, the ignitor unit can wirelessly communicate with the ignition box.

In another exemplary embodiment, the working tool of the tool assembly of the present disclosure can be a grinding device, which may also be referred to as a grinder, used to grind material and debris off the structure being worked on. The grinder can be removably attached to the distal end of the pole. According to various embodiments, the grinder may be operated utilizing a switch provided on the grinder or via the control unit or other control device attached to, for example, the proximal end of the pole. According to yet another embodiment, the grinder may be a pneumatic grinder operated utilizing an air compressor.

Figure 1:
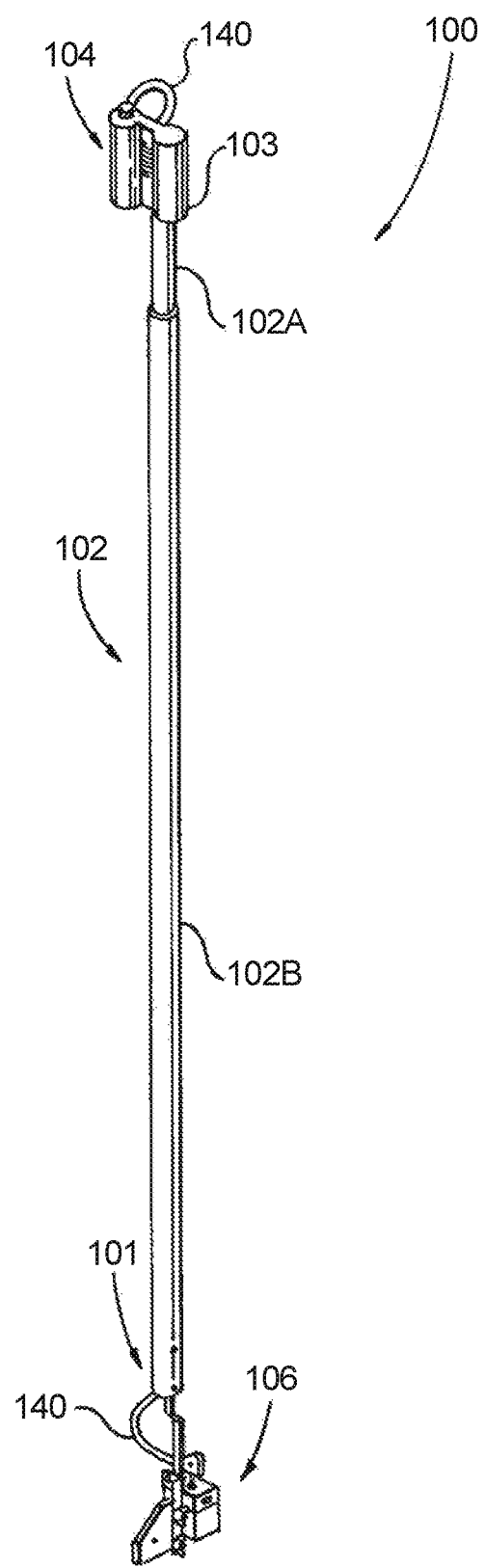
FIG. 1 is a top front perspective view of an exemplary embodiment of a tool assembly according to the present disclosure, illustrating a telescoping pole, a control unit at a proximal end of the telescoping pole and a working tool attached at a distal end of the telescoping pole.

Turning now to the figures, a representative example of a tool assembly for use in confined work spaces according to an embodiment of the present disclosure is shown in FIG. 1 and is referred to generally as tool 100. According to this embodiment, the tool 100 includes a pole 102 having a remote control unit 104 removably attached to a proximal end 103 of the pole 102 and a working tool 106 removably attached to a distal end 101 of the pole 102. In this exemplary embodiment, the working tool 106 is a welding assembly, and the control unit 104 is an ignitor used to initiate a welding process within the welding assembly.

The pole 102 may be, for example, a single section of pipe. According to other embodiments of the present disclosure, pole 102 may be made up of two or more sections of pipe that are dimensioned to slidably fit one inside the other to form a telescoping pole. For example, as shown in FIG. 1, pole 102 is made up of a section of pipe 102A that slidably fits within pipe 102B. Pole 102 may have any suitable cross sectional shape including round (as depicted), square, oval, rectangular, triangular, etc. Pipe sections 102A and 102B may be substantially the same length so that when fully extended, pole 102 will be adjustable in length up to virtually twice the length of a single pipe section. A locking mechanism may be provided for locking the pipe sections 102A and 102B in a desired position. A non-limiting example of a locking mechanism is an internal cam lock (not shown). When pipe 102A is rotated in pipe 102B in a clockwise direction, the internal cam lock expands in pipe 102B locking the two pipe sections 102A and 102B in position. Turning pipe 102A in the counter clockwise direction retracts the internal cam lock thus loosening the two pipe sections 102A and 102B allowing pipe section 102A to be lowered into or extended from pipe section 102B to achieve the desired overall length of pole 102. Of course, other types of locking mechanisms may be provided. For example, such locking mechanisms may include but are not limited to threaded clutch locks, split collar locks, spring button locks, G snap collar locks, set knob locks, etc. Pole 102 may be made of any suitable rigid material such as aluminum including heavy grade aluminum, steel, light weight steel, plastics, composites, etc.

Figure 2:
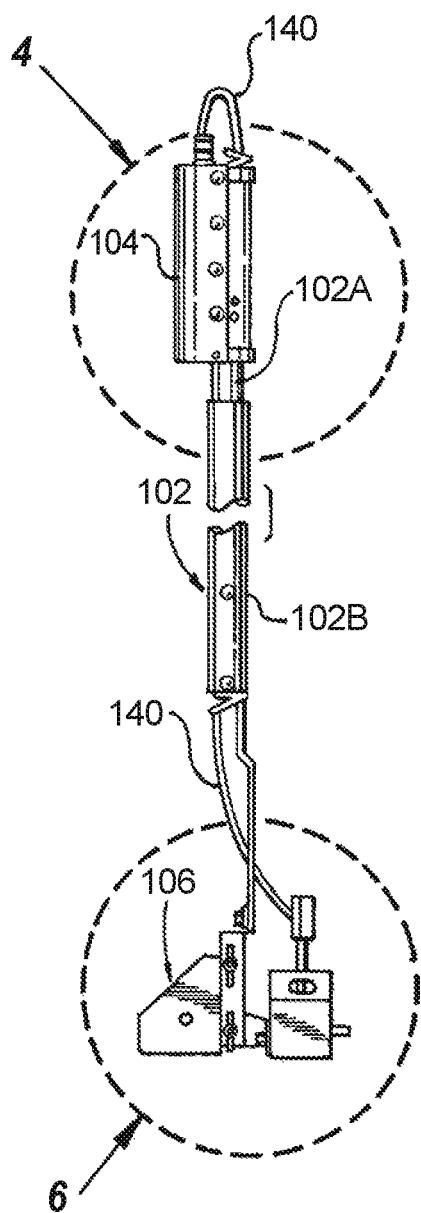
FIG. 2 is a side elevation view of the tool assembly of FIG. 1.
Figure 3:
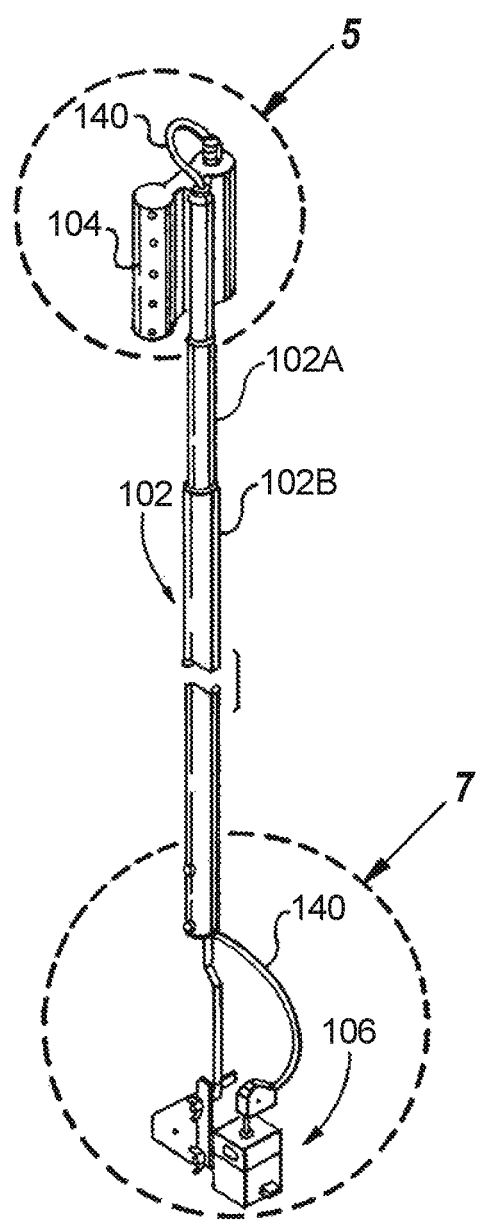
FIG. 3 is a top rear perspective view of the tool assembly of FIG. 1.

The pole 102 is movable between a retracted position, seen in FIG. 2, where the top of the pipe 102B is relatively close to the control unit 104, and an extended position where the top of the pipe 102B is at its farthest distance away from the control unit 104. Using the locking mechanism, the pole 102 can be locked in any position between the retracted position and the extended position, and including the retracted position and the extended position.

Referring to FIGS. 4 and 5, the control unit 104, which in this exemplary embodiment is a remote ignitor, may include clips 502 and 504 for temporarily clipping the control unit 104 to the pole 102. Alternatively, more permanent mounting members such as pipe clamps, nuts/bolts, etc. may be provided for mounting the remote control unit 104 to the pole 102. The control unit 104 includes a cable 140 extending therefrom and through pole 102 to the working tool 106, which in this exemplary embodiment is a welding assembly. According to an embodiment of the present disclosure, cable 140 may be a coiled cable having memory that runs through telescoping pole 102 and is flexible to extend and retract as the length of pole 102 is adjusted.

Figure 6:
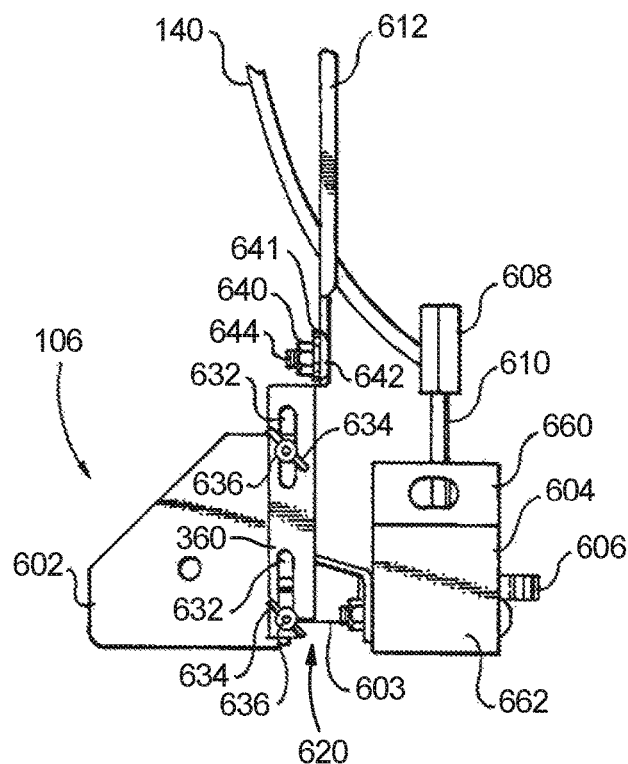
FIG. 6 is a side elevation view of the working tool attached to the distal end of the telescoping pole of FIG. 2 taken from detail 6.
Figure 7:
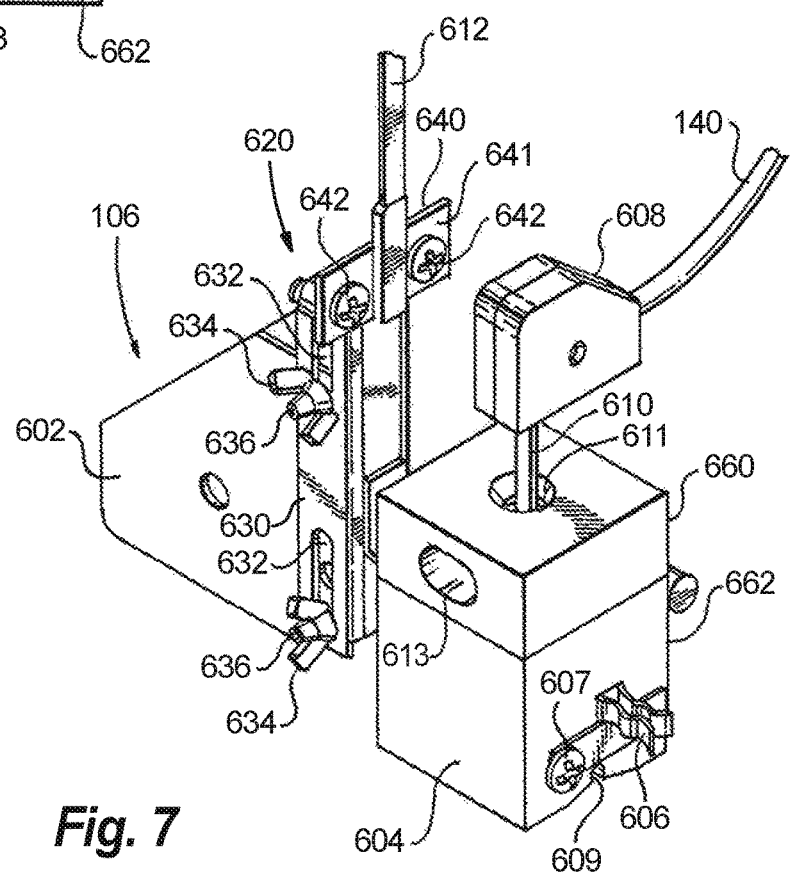
FIG. 7 is a rear perspective view of the working tool attached to the distal end of the telescoping pole of FIG. 3 taken from detail 7.

As noted, the working tool 106 in this exemplary embodiment is a welding assembly. An exemplary embodiment of the welding assembly 106 according to the present disclosure is shown in FIGS. 6 and 7. The welding assembly 106 includes a pipe magnet 602, a mold assembly 604 and an ignition box 608. The pipe magnet 602 is connected to the mold assembly 604 via connector 603 and is used to temporarily position the mold assembly adjacent a structure where the weld process is to occur, which may also be referred to as the working site, working area or work site. The pipe magnet 602 includes a pair of screws 636 extending from a side thereof and used to adjust position of the pipe magnet, as will be described below.

The mold assembly 604 assembly may include an upper member 660 attached to a lower member 662 so that the upper member 660 can be separated from the lower member to permit access to an interior of the mold assembly. As a non-limiting example, the upper member 660 may be attached to the lower member 662 via a hinge (not shown). The mold assembly 604 includes a wire clip 606 positioned on the lower member 662 above a wire receiving notch 609, seen in FIG. 7, formed in the bottom of the lower member of the mold assembly 604. According to this embodiment of the present disclosure, the wire clip 606 is mounted to the mold assembly 604 with one or more screws 607. Of course, the wire clip 606 may be attached to mold assembly 604 via any suitable type of connection.

Continuing to refer to FIGS. 6 and 7, the cable 140 extending from the control unit 104 and through the pole 102 is connected to the ignition box 608. The ignition box 608 includes a plurality of connectors (not shown) that make contact with corresponding connectors on a disposable ignitor stick 610. The ignitor stick 610 extends into an orifice 611 provided in the upper member 660 of the mold assembly 604. One or more vent orifices 613 may be arranged in the sides of upper member 660 of the mold assembly 604 as shown.

A bracket assembly 620 is used to secure the working tool 106 to the pole 102. In an exemplary embodiment, the bracket assembly 620 includes an adjustment plate 630 and a cross-plate 640. The adjustment plate 630 includes slots 632 used to connect the adjustment plate to the pipe magnet 602. As noted above, the pipe magnet 602 includes a pair of screws 636 extending from a side thereof. When securing the working tool 106 to the pole, the screws 632 extending from the pipe magnet 602 are passed through the slots 632 in the adjustment plate 630. Wingnuts 634 can then be attached to screws 636 and tightened to lock the pipe magnet 602 in a desired position, e.g., a desired vertical position. For example, it may be desirable to adjust the vertical position of the pipe magnet 602 so that it is aligned with a bottom surface of the lower member 662 of the mold assembly 604. The cross plate 640 is attached to an upper member of the adjustable plate and is attachable to a corresponding cross plate 641 that is welded or otherwise connected to a tool mount 612 connected to the pole 102. The cross plate 640 is attached to cross plate 641 utilizing nuts 642 and bolts 644. As will be described later below the tool mount 612 is removably attached to pole 102.

Figure 8A:
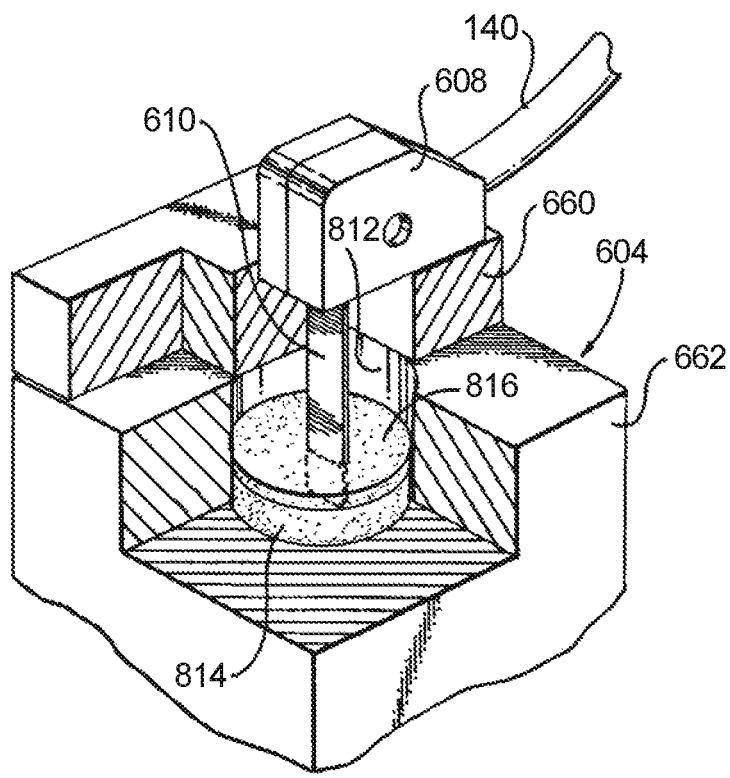
FIG. 8A is an enlarged view of a portion of an exemplary embodiment of a mold assembly of a working tool according to the present disclosure.
Figure 8B:
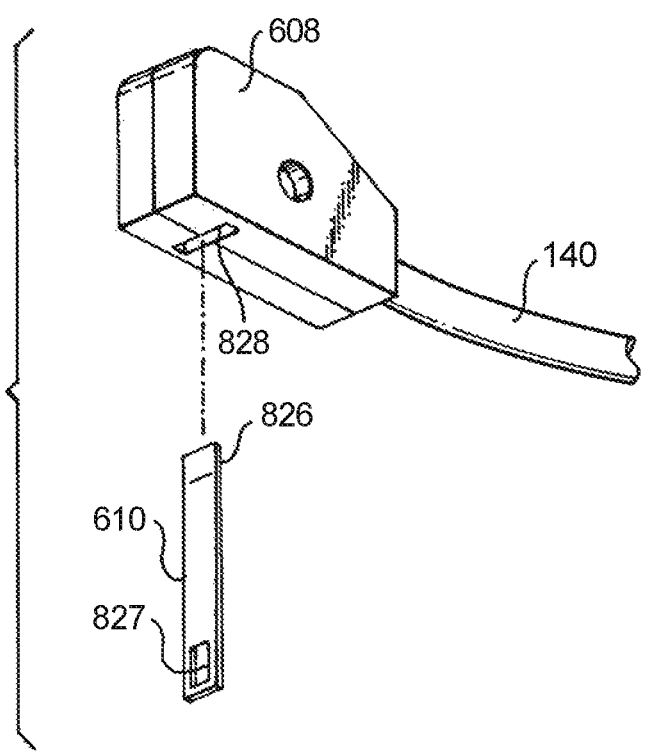
FIG. 8B is an enlarged view of an exemplary embodiment of an ignition box of a mold assembly of a working tool according to the present disclosure.

A portion of the mold assembly 604 according to an exemplary embodiment of the present disclosure is shown in more detail in partial cutaway in FIG. 8A. The mold assembly 604 includes an internal crucible 812 which extends through the lower member 662 of the mold assembly. During use, the crucible 812 of the mold assembly 604 is loaded with a disc of material 814, such as for example steel. The disc of material is generally placed in a bottom portion of the crucible 812 and an exothermic powder 816, such as an exothermic weld powder, is poured into the crucible 812 on top of the disc of material 814. As shown in FIG. 8B, the ignition box 608 includes a slot 828 for removably accepting a disposable ignition stick 610. End 826 of ignition stick 610 includes a pair of electrodes that engage corresponding electrodes (not shown) in the ignition box 608. The distal end 827 of the ignition stick 610 includes an ignition material which may include a strip of wire of two different metallic elements in contact with each other. For example, the metallic elements may be palladium and aluminum. As shown in FIGS. 7 and 8A, the distal end 827 of the disposable ignition stick 610 is slid into the orifice 611 in the upper member 660 of the mold assembly 604 and into the exothermic powder 816 in the lower member 662. When an electrical signal is sent from the control unit 104 to the ignition box 608, the ignition material on the distal end 827 of the ignition stick 610 ignites which in turn ignites the exothermic powder 816 within the crucible 812 starting an exothermic reaction. The exothermic reaction liquefies the exothermic powder 816 and the disc of material 814, which then flows down from the crucible out through the bottom of the mold assembly 604 to creating a weld. As will be described later below, a permanent weld can be used to join materials including, for example, joining a sacrificial cable to a pipe. When the mold assembly 604 has sufficiently cooled, the mold assembly 604 can be removed from the confined space.

Figure 9:
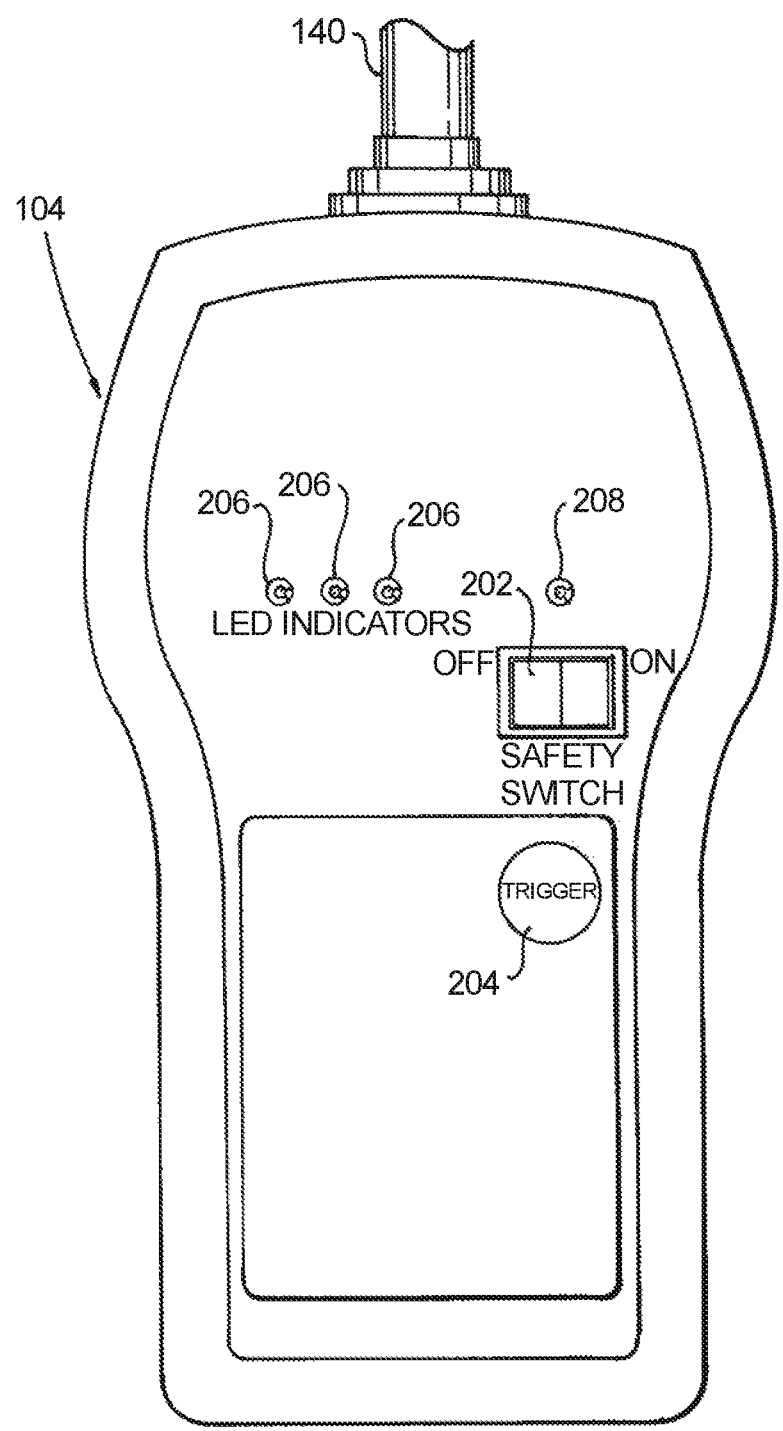
FIG. 9 is a view of an exemplary embodiment of a control unit of the tool assembly according to the present disclosure.

As shown in more detail in FIG. 9, the control unit 104 according to an exemplary embodiment of the present disclosure includes safety switch 202, trigger button 204 and a plurality of LED indicators 206 and 208. The safety switch 202 is a rocker, sliding or toggle switch capable of toggling between "OFF" and "ON" positions as shown. Although not shown, the control unit 104 includes a battery compartment allowing batteries to be inserted therein for providing power to the control unit. Indicators 206 indicate battery strength. For example, indicators 206 may include a green LED indicating full battery charge, a red LED indicating low battery charge and that replacement or recharge of the batteries is required, and an amber LED indicating the battery charge is somewhere between a full battery charge and a low battery charge. When safety switch 202 is in the OFF position, the control unit 104 is disarmed such that pressing trigger button 204 will have no effect. When the safety switch 202 is in the ON position, the LED indicator 208 will light green indicating that the control unit is armed. At this stage, pressing trigger button 204 will send an electrical signal to the working tool 106, here the ignition box of the welding assembly, via cable 140 initiating one or more actions of the working tool, here an exothermic reaction.

Figure 10:
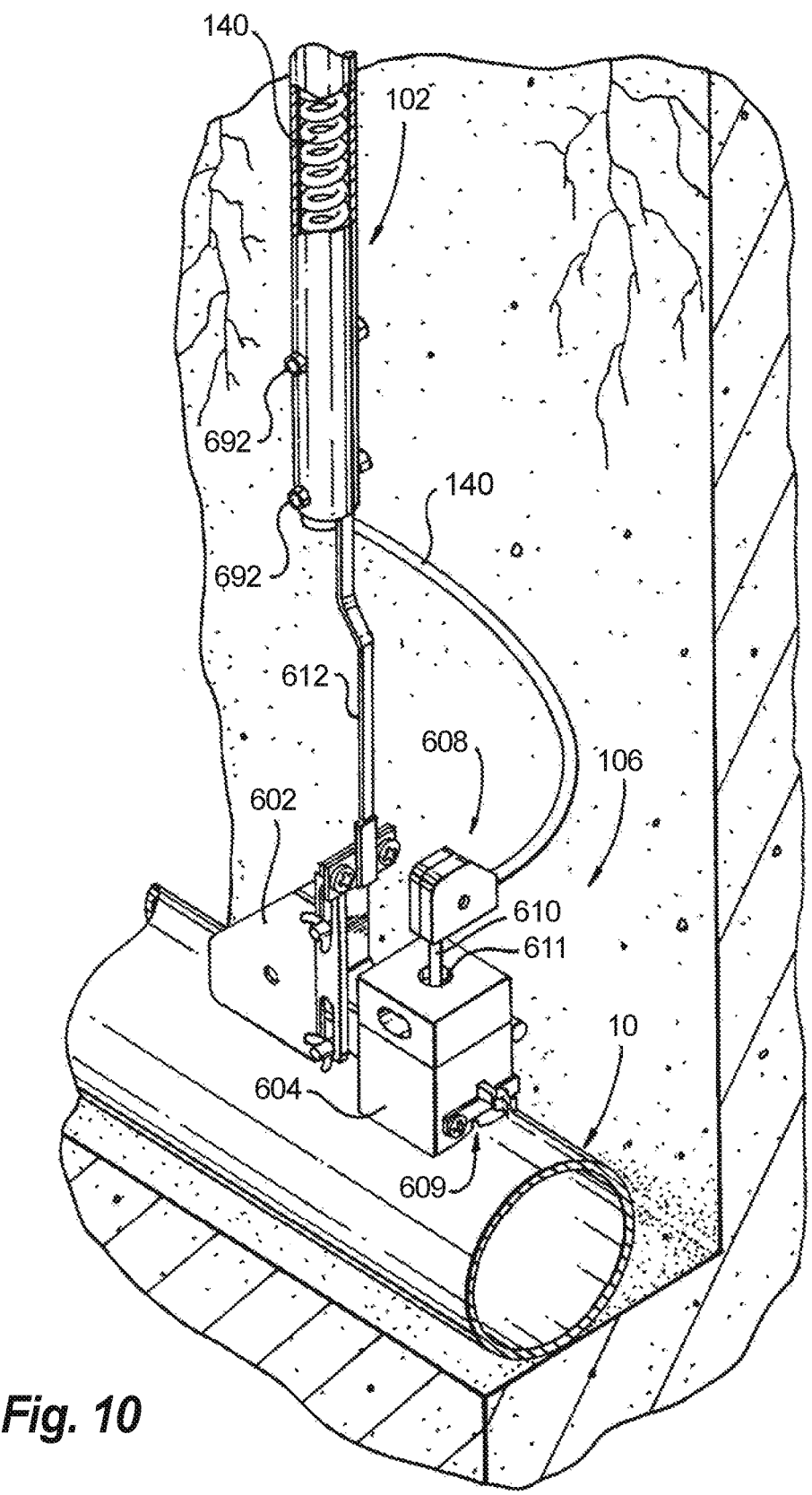
FIG. 10 is perspective view of an exemplary embodiment of the tool assembly according to the present disclosure, illustrating a working tool attached to a distal end of a telescoping pole of the tool assembly and the working tool positioned adjacent a pipe.
Figure 11:
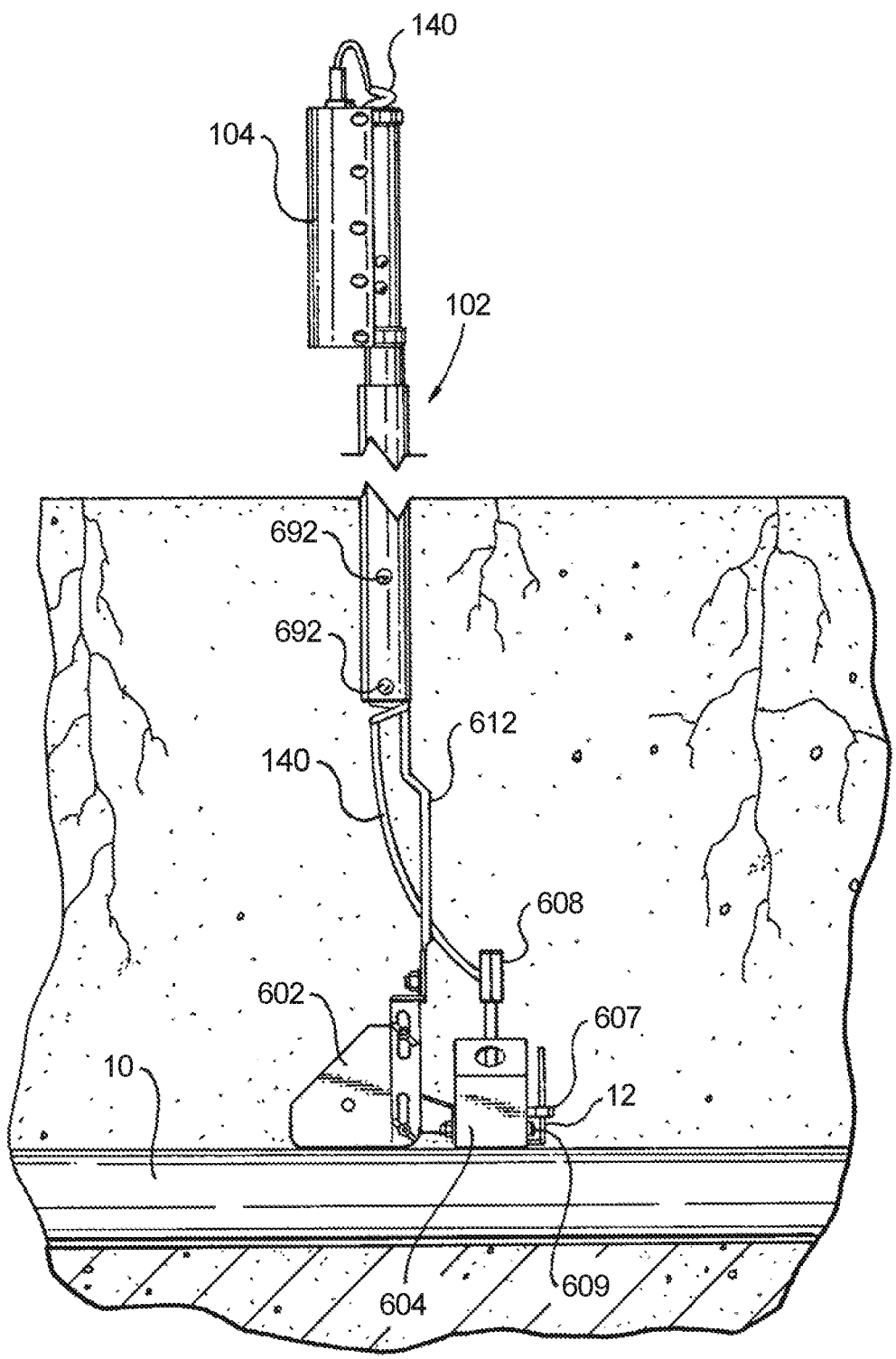
FIG. 11 is side elevation view of an exemplary embodiment of the tool assembly according to the present disclosure, illustrating a working tool attached to a distal end of a telescoping pole of the tool assembly and the working tool positioned adjacent a pipe within a keyhole excavation.
Figure 15:
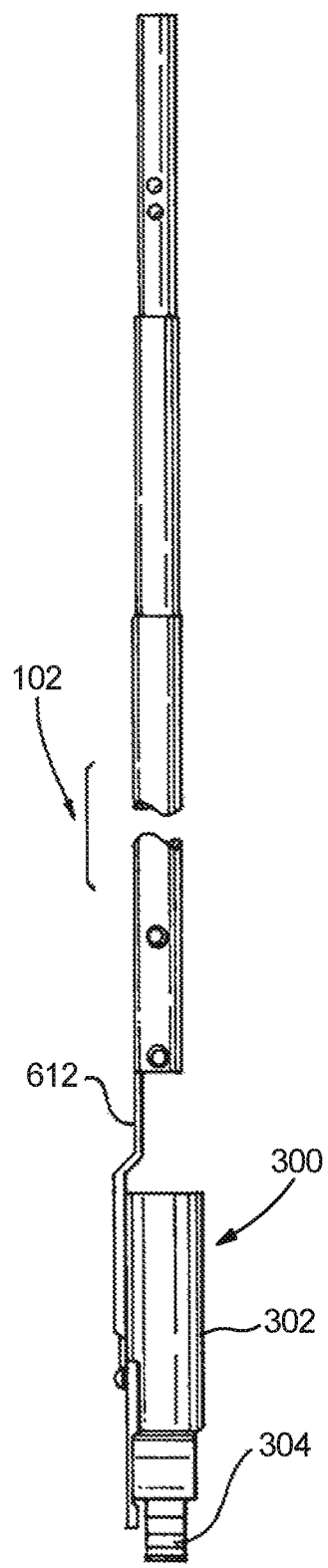
FIG. 15 is a side elevation view of the tool assembly of FIG. 12.
Figure 16:
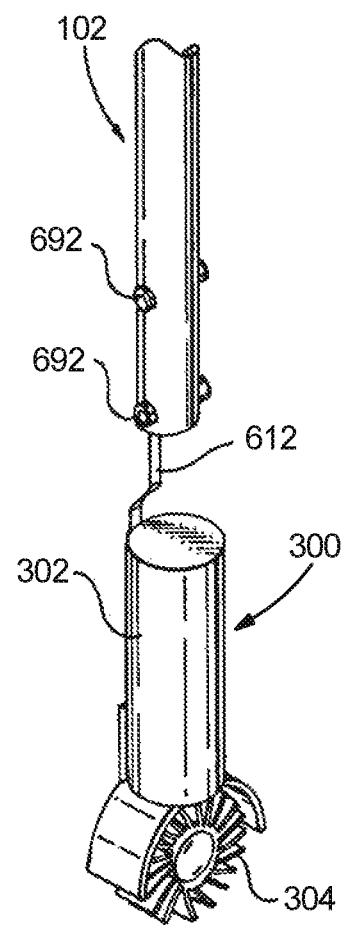
FIG. 16 is an enlarged front perspective view of the grinding tool of FIG. 15.
Figure 17:
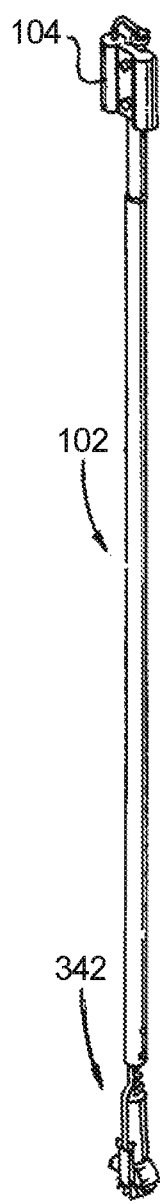
FIG. 17 is a perspective view of another exemplary embodiment of tool assembly according to the present disclosure, illustrating a grinding tool as the working tool attached to a distal end of a telescoping pole and a cable attached to the grinding tool.
Figure 18:
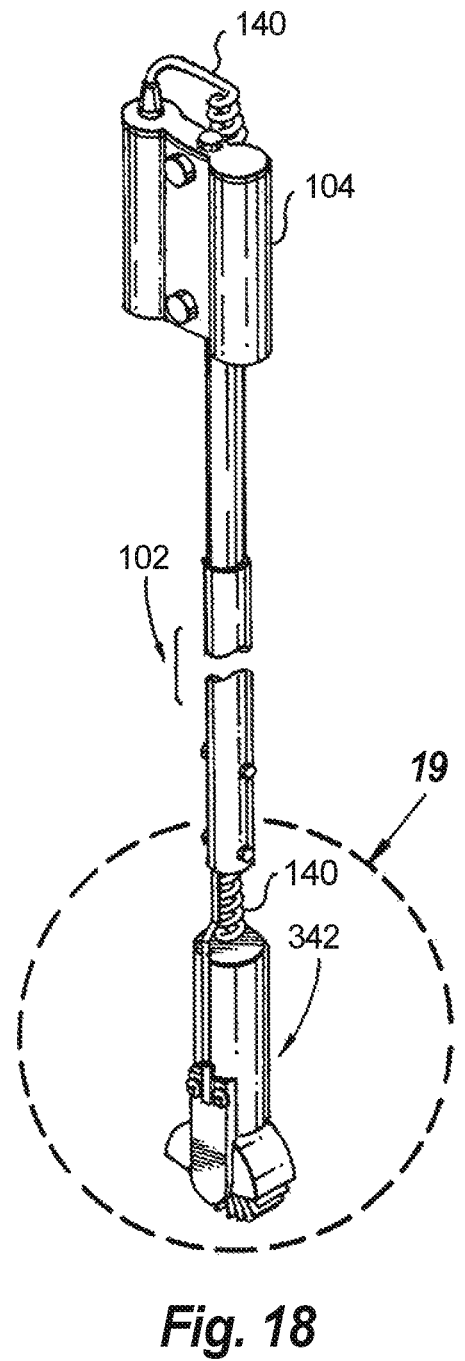
FIG. 18 is a perspective view of the distal end of the tool assembly of FIG. 17.
Figure 19:
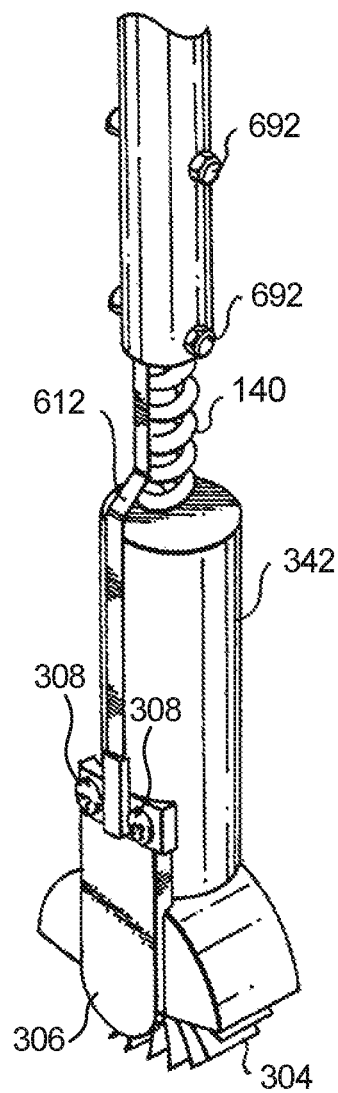
FIG. 19 is a rear perspective view of the grinding tool of FIG. 18 taken from detail 19.
Figure 20:
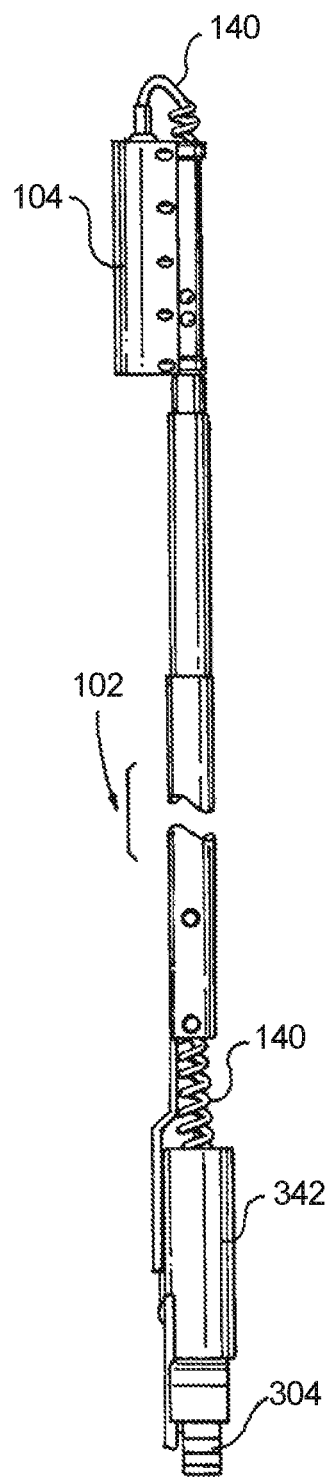
FIG. 20 is a side elevation view of the tool assembly of FIG. 17.
Figure 21:
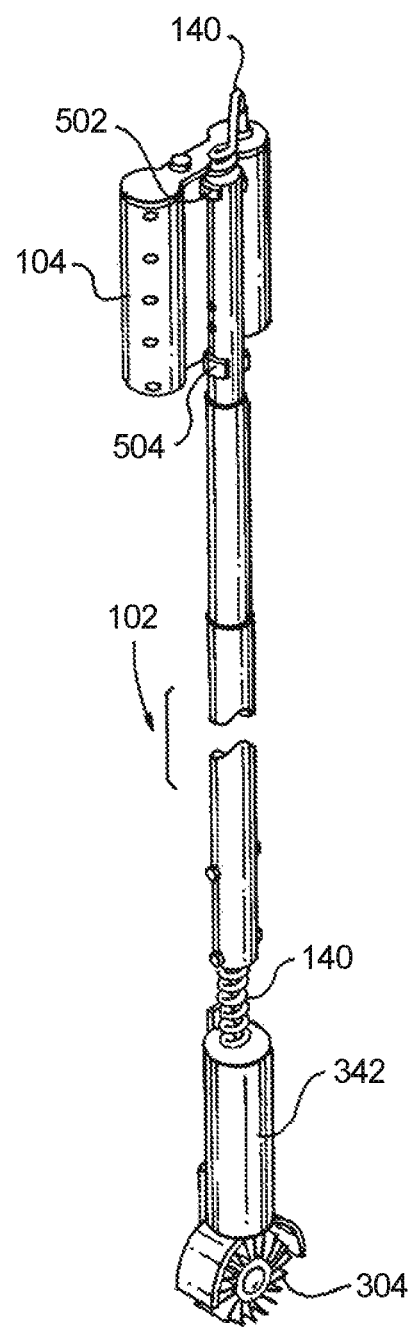
FIG. 21 is a front perspective view of the grinding tool of FIG. 20.

Operation of the tool assembly according to one exemplary embodiment will be described with reference to FIGS. 10 and 11. Initially, a free end of the tool mount 612 is attached to the pole 102 utilizing one or more nuts and bolts 692. A conductor 12 (e.g., cable, wire, etc.) is bent in, for example, an L shape and the end is slid into the wire receiving notch 609 in the bottom of mold 604, seen in FIG. 11. The conductor 12 is then clipped onto clip 607 to hold the conductor 12 in position relative to the mold assembly 604 and the pipe 10. The mold assembly 604 is then loaded with, for example, the metallic disc 814 and exothermic powder 816, and the disposable ignition stick 610 is inserted into ignition box 608 and into orifice 611 in the upper member 660 of the mold assembly 604. The welding assembly 106 is then lowered into a keyhole excavation utilizing pole 102 and placed in position on pipe 10. Pipe magnet 602 attaches to the pipe 10 maintaining the welding assembly 106 in position relative to the pipe 10. At this stage, the remote ignitor 104 can be used to initiate the exothermic reaction such that the conductor 12 is permanently exothermically welded to the pipe 10. According to an embodiment of the present disclosure, a lower surface of pipe magnet 602 and/or the lower surface of the power member 662 of the mold assembly 604 may have a slightly arched surface having a radius that corresponds to the radius of the pipe 10 being welded.

To create a permanent weld to pipe 10, it may be beneficial to perform a polishing or cleaning process on the pipe 10 to clean the surface to be welded (i.e., the working site) prior to performing the welding process. In addition, after the welding process is complete, it may be beneficial to inspect the weld and if the weld is satisfactory to perform a coating process to provide a protective coating on the surface of the weld to prevent galvanic corrosion between the conductor 12 and the pipe 10. According to exemplary embodiments of the present disclosure, additional working tools are provided that can be connected to the telescoping pole 102 for performing these processes.

According to an embodiment of the present disclosure as shown in FIGS. 12-16, a grinding device 300 may be attached to the distal end of the telescoping pole 102 as the working tool. The pole 102 is attached to a mounting member 306 of grinding device 300 via the tool mount 612, which is secured to the distal end of the pole 102 utilizing one or more nuts and bolts 692, seen in FIGS. 14 and 16. For example, the cross plate 641 of tool mount 612 may be attached to the mounting member 306 utilizing screws 308. In this exemplary embodiment, the grinding device 300 includes a motor 302 that is geared for rotatably driving a grinder wheel 304. According to an exemplary embodiment of the present disclosure, the grinder wheel 304 may be a flat wheel abrasive sander. Of course, other types of grinder wheels may be utilized as desired. According to an exemplary embodiment, the grinding device 300 may include a battery (not shown) and an ON/OFF switch 310. In operation, the grinding device 300 is turned ON via switch 310 causing grinder wheel 304 to rotate. The grinding device 300 is then lowered into the keyhole excavation using the telescoping pole 102 and is used to grind the top of the pipe to be welded.

Referring to FIGS. 17-21, another exemplary embodiment of the tool assembly according to the present disclosure is shown. In this exemplary embodiment, the working tool is a grinding device 342 that is powered and/or controlled by the control unit 104, which may be similar to the control unit shown in FIG. 9, via cable 140 extending from a proximal end of the pole 102 to a distal end of the pole, as described above. In this exemplary embodiment, the ON/OFF switch 202 in the control unit 104, seen in FIG. 9, or another switch provided specifically for the grinder device 342 may be used to turn the grinding device ON and OFF as desired. According to another embodiment of the present disclosure, the grinding device 342 may be pneumatically driven.

Figure 22:
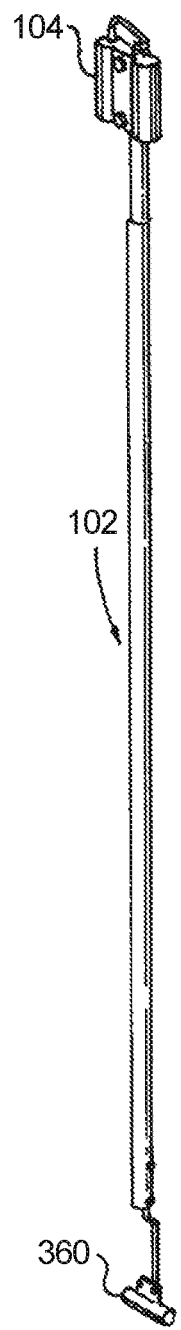
FIG. 22 is a perspective view of another exemplary embodiment of tool assembly according to the present disclosure, illustrating an applicator device as the working tool attached to a distal end of a telescoping pole.
Figure 23:
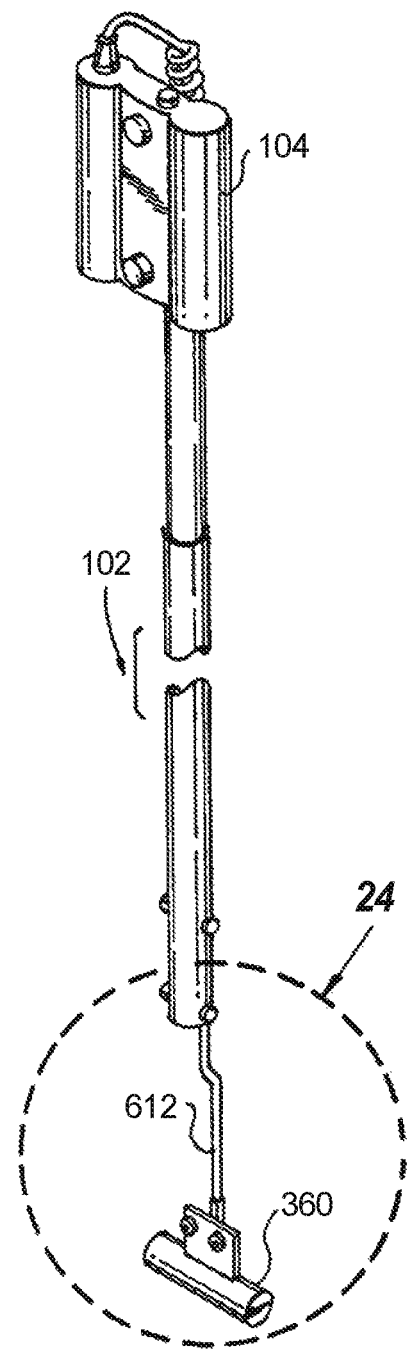
FIG. 23 is a front perspective view of the tool assembly of FIG. 22.
Figure 24:
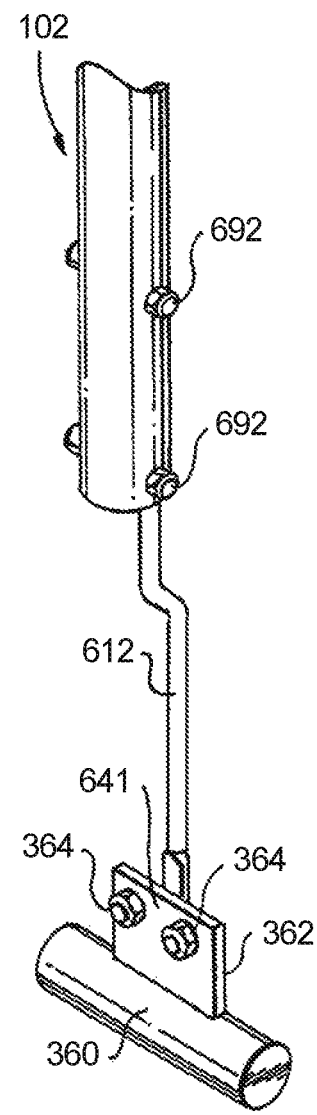
FIG. 24 is a front perspective view of the applicator device of FIG. 23 taken from detail 24.

Referring to FIGS. 22-24, another exemplary embodiment of the tool assembly according to the present disclosure is shown. In this exemplary embodiment, the working tool is an applicator device 360 that may be attached to telescoping pole 102. According to this embodiment, a mounting member 362 of the applicator device 360 is attached to the pole 102 via the tool mount 612, which is secured to the distal end of the pole 102 utilizing one or more nuts and bolts 692, seen in FIGS. 23 and 24. For example, cross plate 641 of tool mount 612 may be attached to the mounting member 362 of the applicator device 360 utilizing nuts and bolts 364. An anticorrosive material may then be applied to the applicator device 360, and the applicator device can then be lowered into the keyhole excavation utilizing the telescoping pole 102. The applicator device 360 is then pressed against the work site so that the anticorrosive material is applied to and covers the weld. The anticorrosive material can be any number of applicable materials capable of protecting the working site from corrosion. Non-limiting examples of the anticorrosive material include rubber, epoxy, paint, mortar, asphalt, etc. The applicator device 360 shown in FIGS. 22-24 is a passive device not requiring power. Accordingly, the applicator device 360 can be utilized on a pole 102 with or without the control unit 104 attached thereto. The present disclosure also contemplates that the applicator device 360 can be an active device having a motor that can be activated either directly or remotely, to activate the applicator to apply the anticorrosive material to the working site. The motor could be similar to the motor described above, and the motor could be activated by an ON-OFF switch on the motor or the ON-OFF switch on the control unit 104.

Figure 25:
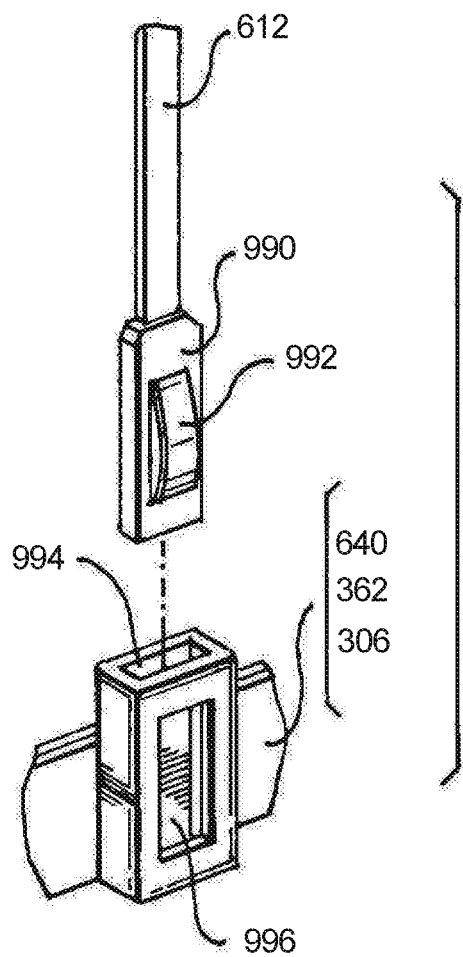
FIG. 25 is an enlarged perspective view of an exemplary embodiment of a quick connect/disconnect system for attaching working tools to the telescoping pole of the present disclosure.

Referring to FIG. 25, a quick connect/disconnect system may be provided for attaching working tools to pole 102. For ease of description the quick connect/disconnect system may also be referred to as the "connect system." According to an exemplary embodiment, the connect system includes a half loop of heavy gauge spring steel 992 that extends from one side of a distal end 990 of the tool mount 612. The working tools to be attached to pole 102 via the tool mount 612 would include corresponding slots 994 and notches 996 for receiving the distal end 990 of the tool mount 612. For example, in the various exemplary embodiments of the working tool described herein, the cross plate 640, seen in FIGS. 6 and 7, the mounting member 306, seen in FIGS. 14 and 19, and the mounting member 362, seen in FIG. 24, may each include a slot 994 for receiving the distal end 990 of the tool mount 612. The tool mount 612 is slid into slot 994 until loop 992 engages notch 996 which temporarily locks the working tool to the tool mount 612 and thus the pole 102. The working tool can be separated from the tool mount 612 by pressing loop 992 in and pulling the tool mount 612 out from slot 994. Of course, other types of connect systems that permit quick connection and disconnection of the working tool from the pole and/or tool mount may be utilized as desired.

Figure 26:
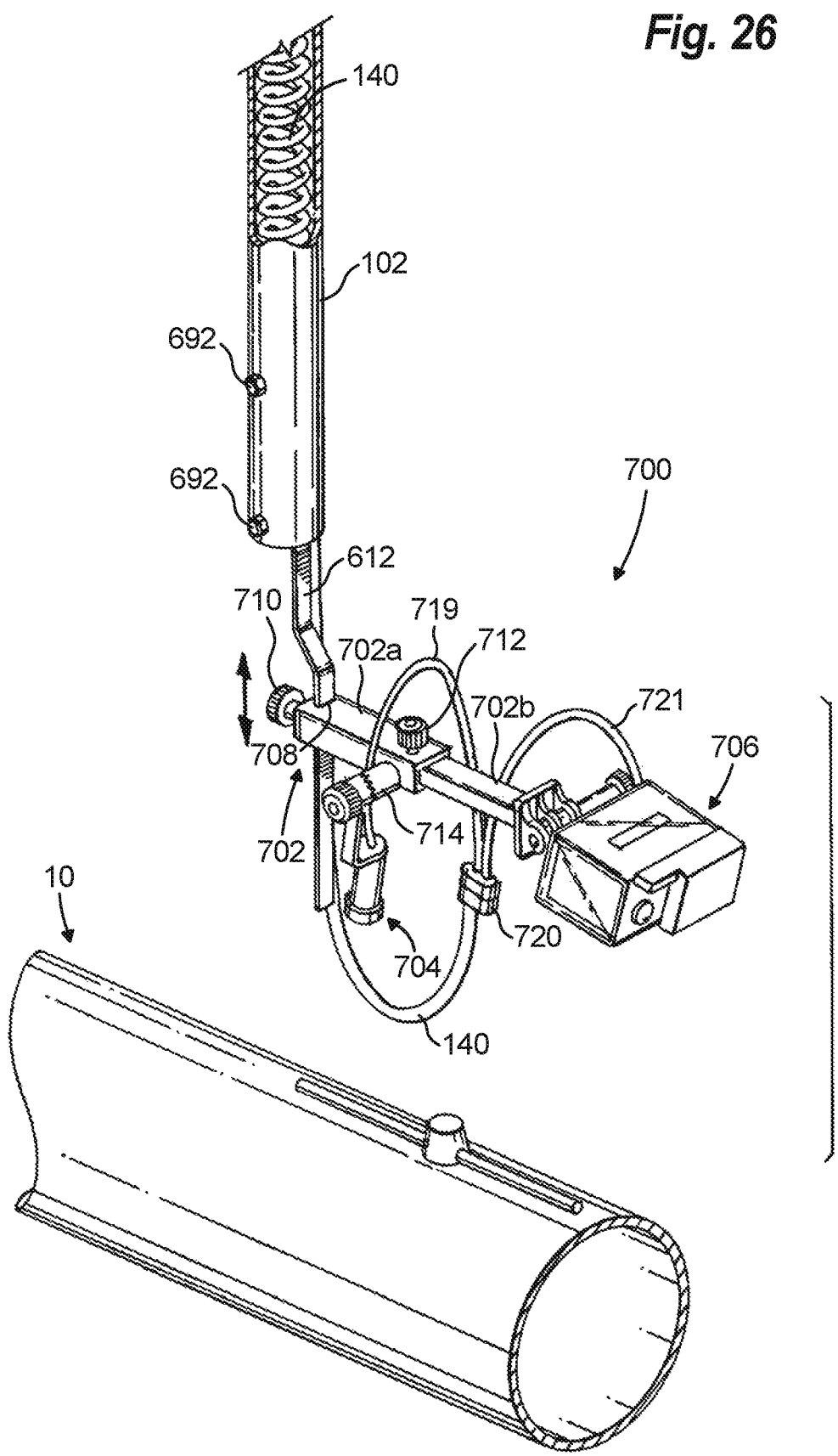
FIG. 26 is a top perspective view of another exemplary embodiment of tool assembly according to the present disclosure, illustrating a lighting and camera assembly attached to a distal end of a telescoping pole.
Figure 27:
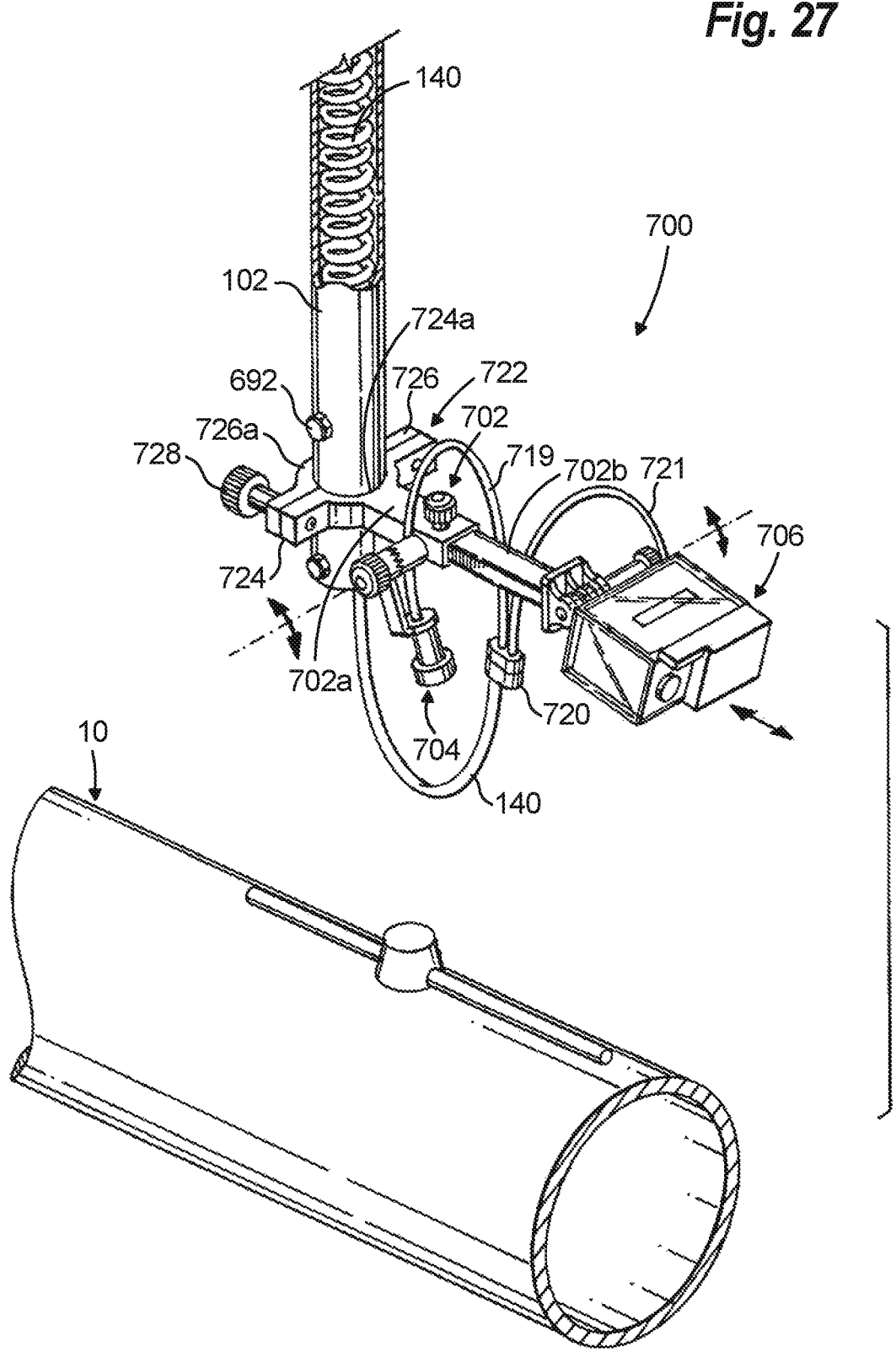
FIG. 27 is a top perspective view of another exemplary embodiment of tool assembly according to the present disclosure, illustrating a lighting and camera assembly attached to a distal end of a telescoping pole.
Figure 28:
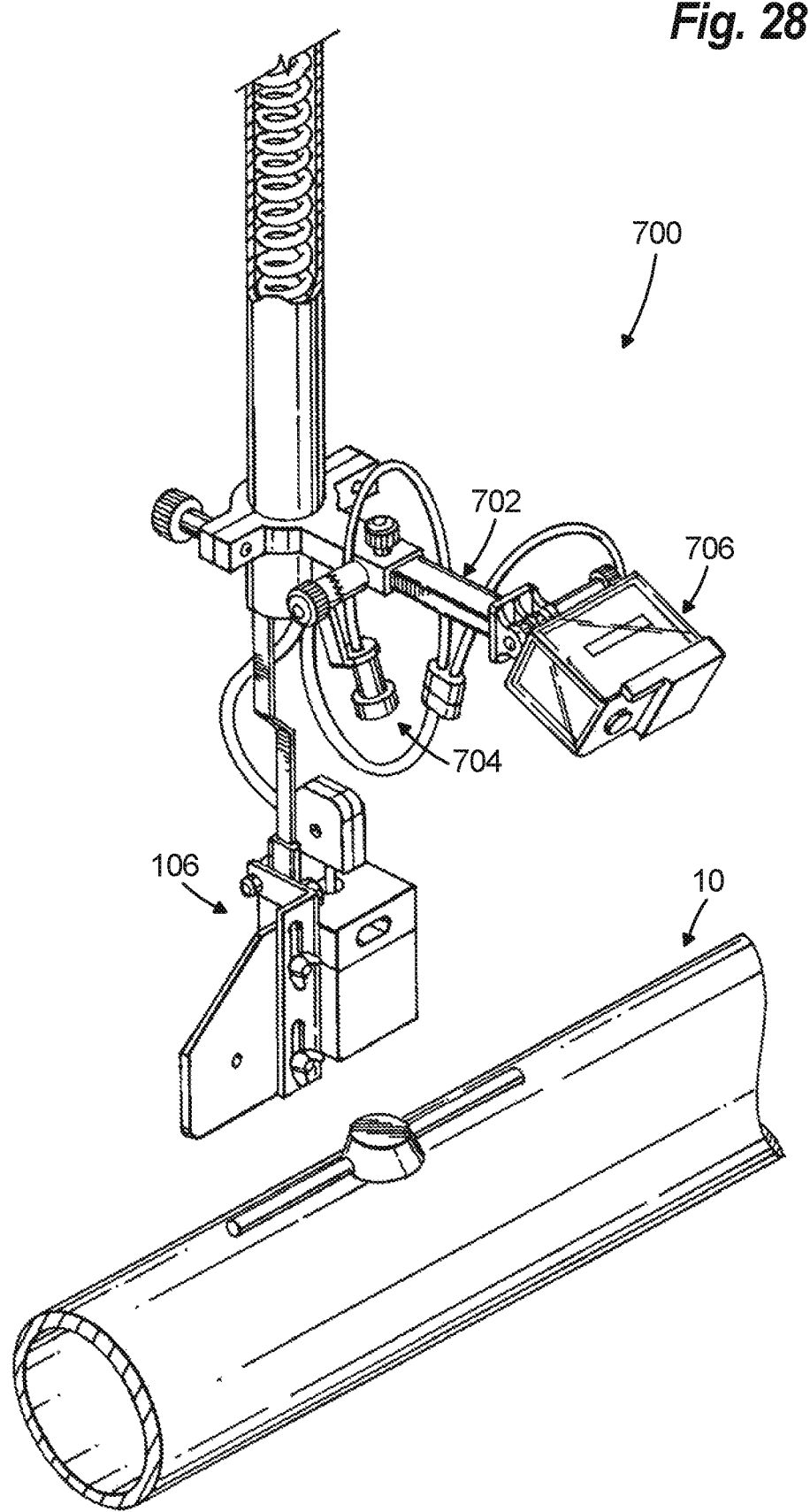
FIG. 28 is a top perspective view of another exemplary embodiment of tool assembly according to the present disclosure, illustrating a lighting and camera assembly attached to a distal end of a telescoping pole and a working tool assembly attached to the distal end of the telescoping pole.

Referring now to FIGS. 26-28, additional exemplary embodiments of the tool assembly according to the present disclosure are shown. In the exemplary embodiment of FIG. 26, the working tool is a viewing assembly 700 that includes a telescoping bracket 702, a lighting device 704 attached to the telescoping bracket 702 and a camera device 706 attached to the telescoping bracket 702. In this exemplary embodiment, the telescoping bracket 702 has a slot 708 in one end that can receive a free distal end of the tool mount 612. The other end of the tool mount 612 is attached to the pole 102 utilizing one or more nuts and bolts 692, as described above. A threaded nut 710 extending through the telescoping bracket 702 into the slot 708 and is used to secure the telescoping bracket 702 in position relative to the tool mount 612. The telescoping bracket 702 has an outer bracket member 702a and an inner bracket member 702b where the inner bracket member 702b is slidable relative to the outer bracket member 702a. A threaded nut 712 extending through the telescoping bracket 702 is used to secure the inner bracket member 702a in position relative to the outer bracket member 702b. Extending from a side of the telescoping bracket 702 is a locking swivel bracket 714 used to secure the lighting device 704 to the telescoping bracket 702 and to permit adjustment of the lighting device 704 relative to the telescoping bracket such that light from the lighting device can illuminate a working area, e.g., a weld on pipe 10. The lighting device can be an LED light that is electrically connected to the cable 140 via a connector 720 and cable 719. This permits the lighting device to be controlled remotely via the control unit 104. In another exemplary embodiment, the lighting device can be wirelessly controlled using known wireless communication technology and protocols. Non-limiting examples of known wireless communication technology and protocols include wireless telephone communication technology and protocols, e.g., cellular technology and protocols, ZigBee compatible wireless communications technology and protocols, wireless networking technologies and protocols, e.g., Wi-Fi and WiMAX, Bluetooth compatible technology and protocols, and infrared wireless communication technology and protocols. Extending from a distal end of the inner bracket member 702b is a locking swivel bracket 718 used to secure the camera device 706 to the telescoping bracket 702 and to permit adjustment of the camera device 706 relative to the telescoping bracket, such that the camera can inspect the working area, e.g., a weld on pipe 10. The camera device can be any known camera, such as a conventional miniature video or still camera or a miniature infrared camera, that can provide real-time video or images of the working area. The camera device 706 is electrically connected to the cable 140 via a connector 720 and cable 721. This permits the camera device to be controlled remotely via the control unit 104. In another exemplary embodiment, the camera device can be wirelessly controlled using known wireless communication technology and protocols. Non-limiting examples of known wireless communication technology and protocols include wireless telephone communication technology and protocols, e.g., cellular technology and protocols, ZigBee compatible wireless communications technology and protocols, wireless networking technologies and protocols, e.g., Wi-Fi and WiMAX, Bluetooth compatible technology and protocols, and infrared wireless communication technology and protocols.

In the exemplary embodiment of FIG. 27, the working tool is the viewing assembly 700 described above, which includes the telescoping bracket 702, the lighting device 704 attached to the telescoping bracket 702 and the camera device 706 attached to the telescoping bracket 702. However, in this exemplary embodiment, the telescoping bracket 702 is attached directly to the distal end of the pole 102 as shown. An exemplary way to mount the telescoping bracket 702 to the pole 102 is to use a clamp assembly. In this exemplary embodiment, the clamp assembly 722 includes first clamp member 724 and a second clamp member 726 that can be releasably secured to the first clamp member. More specifically, one end of the outer bracket member 702*a* of the telescoping bracket 702 may be formed as the first clamp member 724 of the clamp assembly 722, as shown. The first clamp portion has a pole support 724*a* that is configured to receive a portion of the pole 102 and the second clamp portion 726 has a pole support 726*a* that is configured to receive another portion of the pole 102. In the embodiment shown, the pole 102 is circular such that the pole supports 724*a* and 726*a* are arcuate in shape. However, as noted above, the pole can come in many shapes such that the pole supports 724*a* and 726*a* can come in any shape to receive the pole. The second clamp member 726 can be releasably secured to the first clamp member using threaded screws 728 that pass through the second clamp member 726 and threaded into threaded apertures in the first clamp member 724 as shown. When tightened, the clamp members 724 and 726 clamp the pole 102 to the clamp assembly 722 at a desired location on the pole.

In the exemplary embodiment of FIG. 28, the working tool is the viewing assembly 700 described above, which includes the telescoping bracket 702, the lighting device 704 attached to the telescoping bracket 702 and the camera device 706 attached to the telescoping bracket 702. In this exemplary embodiment, the telescoping bracket 702 is attached directly to the distal end of the pole 102 as shown and described above with reference to FIG. 27. In this exemplary embodiment, a second working tool 106 is attached to the free distal end of the tool mount 612 as described above. Non-limiting examples of the second working tool attached to the tool mount 612 include the welding assembly, grinding device and applicator device described above. However, one skilled in the art would readily appreciate that the second working tool may be any other working tool to be used in confined spaces such as a keyhole excavation. It is noted that the connect system described above in FIG. 25 may also be used to connect the viewing assembly to the telescoping pole. In this exemplary embodiment, the lighting device 704 can be used to illuminate the working area, e.g., the area where the second working tool 106 is performing its operation, and the camera device 706 is used to video the illuminated working area.

Figure 29:
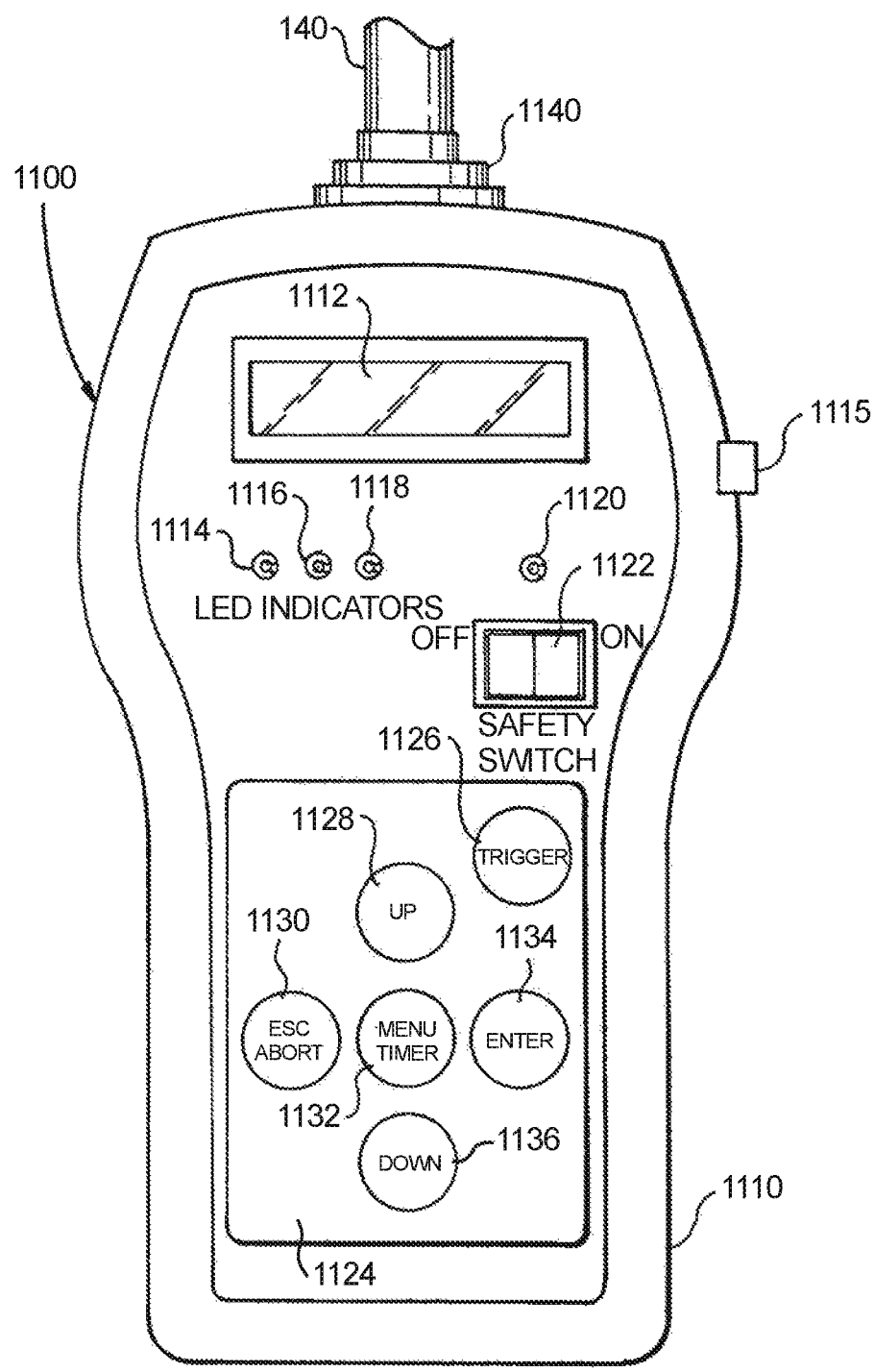
FIG. 29 is a view of a control unit according to an illustrative embodiment of the present disclosure.

As described herein, the tool assemblies according to the present disclosure are configured to have a working tool attached to a telescoping pole so that the working tool can be inserted into a keyhole excavation to perform an operation on a structure, e.g., a pipe, within the keyhole excavation. Further, when the working tool is a welding assembly, during the exothermic reaction, hot gasses, flames, etc. may be emitted from the mold assembly as noted above, which may present a hazardous condition to the operator. As described above, the control unit 104 for initiating the exothermic reaction is a remote ignitor. Another exemplary embodiment of the control unit according to the present disclosure is shown in FIG. 29 and is referred to generally as programmable remote ignitor 1100. The programmable remote ignitor 1100 may also be referred to herein as the "programmable ignitor." According to this exemplary embodiment, the programmable ignitor 1100 can be programmed to set a time delay for initiating the exothermic reaction. This allows a user to set the welding assembly 106 in the keyhole excavation and on the structure to be welded. The programmable ignitor 1100 can then be set to any time delay for initiating the exothermic reaction. This gives the operator of the tool assembly time to move a safer distance away from the keyhole excavation prior to the exothermic reaction occurring. The components of the programmable ignitor 1100 are provided in a compact control box enclosure 1110. The input/output controls are provided on a front face of the enclosure 1110 as shown via display 1112 and control keypad 1124. According to an exemplary embodiment, the display 1112 may be a liquid-crystal display (LCD) that includes two rows of 16 characters. Of course, the display 1112 may be formed from any suitable type of display including light-emitting diodes (LEDs), organic light-emitting diodes (OLEDs), etc. In addition, the display may have one row of characters or more than two rows of characters, and the character length of each row may be great than or less than 16 characters.

The front face of the of the enclosure 1110 may also include several LED indicator lights that include, for example, a red light 1114, an amber light 1116 and a green light 1118, the function of each will be described later below. An additional indicator light 1120, which may be a red LED indicator light, is also provided. A safety switch 1122, e.g., a rocker, sliding or toggle switch, capable of toggling between "OFF" and "ON" positions may be provided and accessible from the front face of the enclosure 1110, as shown. The control keypad 1124 includes a series of touch buttons used to permit user input to programmable ignitor 1100. The touch buttons may include, for example, a TRIGGER button 1126, an UP button 1128, an ESCAPE/ABORT button 1130, a MENU TIMER button 1132, an ENTER button 1134 and a DOWN button 1136. An output connector 1140 is provided so that cable 140 can be removably attached to the programmable ignitor 1100. The programmable ignitor 1100 also includes a power ON/OFF switch 1115.

Figure 30A:
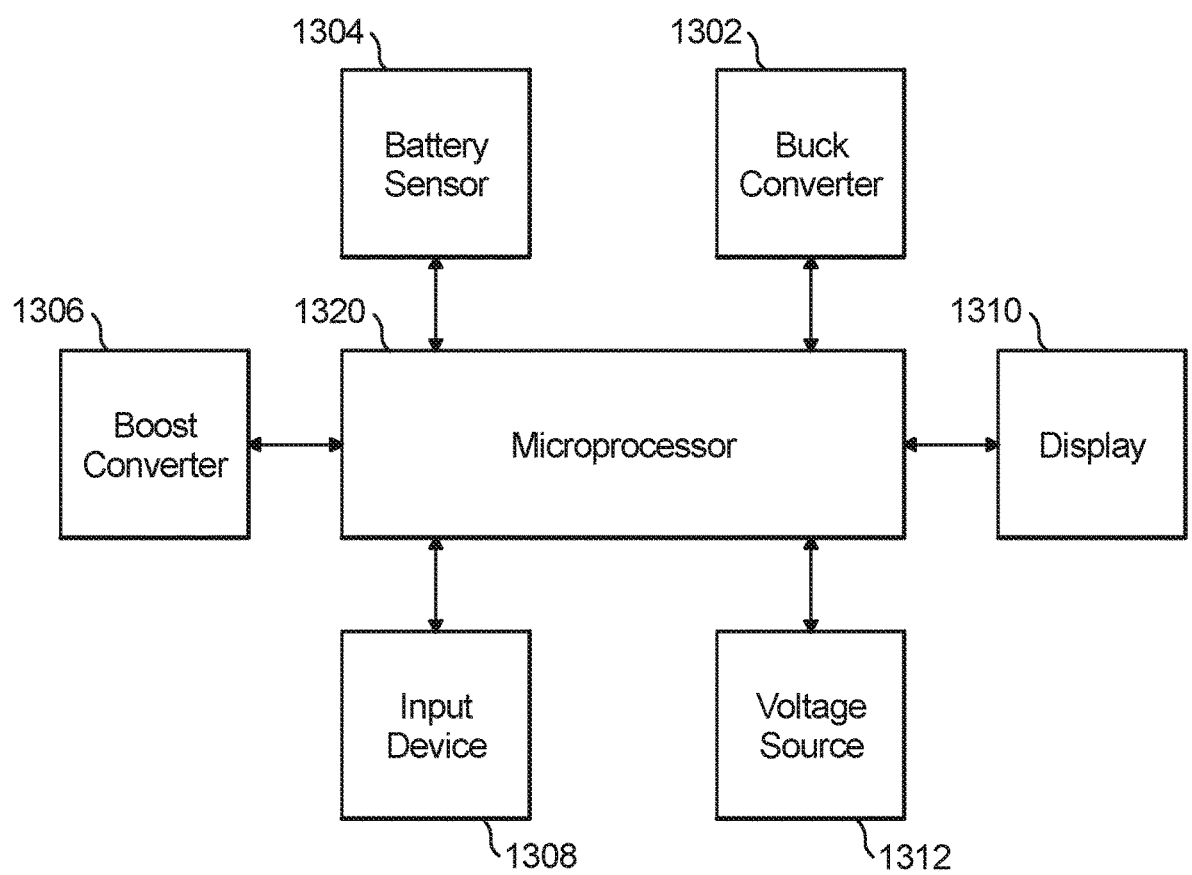
FIG. 30A is block diagram of electronic components for an control unit according to an exemplary embodiment of the present disclosure.

FIG. 30A is a block diagram depicting the electronic components 1300 forming the programmable ignitor 1100. The electronic components 1300 may include, for example, a processor 1320, such as a microprocessor or a microcontroller. A nonlimiting example of a microcontroller is the PIC16F1717 provided by MICROCHIP. In this exemplary embodiment, the processor 1320 is an 8-bit processor and includes internal 14 KB programmable flash memory and 1 KB RAM. Of course, other suitable microprocessors and/or discrete memory components may be utilized. The electronic components 1300 may also include a voltage step down and current step up circuit such as Buck Converter 1302. A step-up converter such as Boost Converter 1306 may also be provided. The Boost Converter 1306 is controlled by processor 1320 and the output of Boost Converter 1306 is wired to the output connector 1140, seen in FIG. 29. Battery sensor circuitry 1304 may be provided for sensing the voltage being output by voltage source 1312. According to an exemplary embodiment, the voltage source 1312 may include one or more dry cell batteries. The input device 1308 includes circuitry for inputting information to processor 1320 from control keypad 1124 and safety switch 1122. The display device 1310 includes circuitry for outputting information to the display 1112 on the front face of the enclosure 1110 and for controlling the LEDs 1114-1120.

Figure 30B:
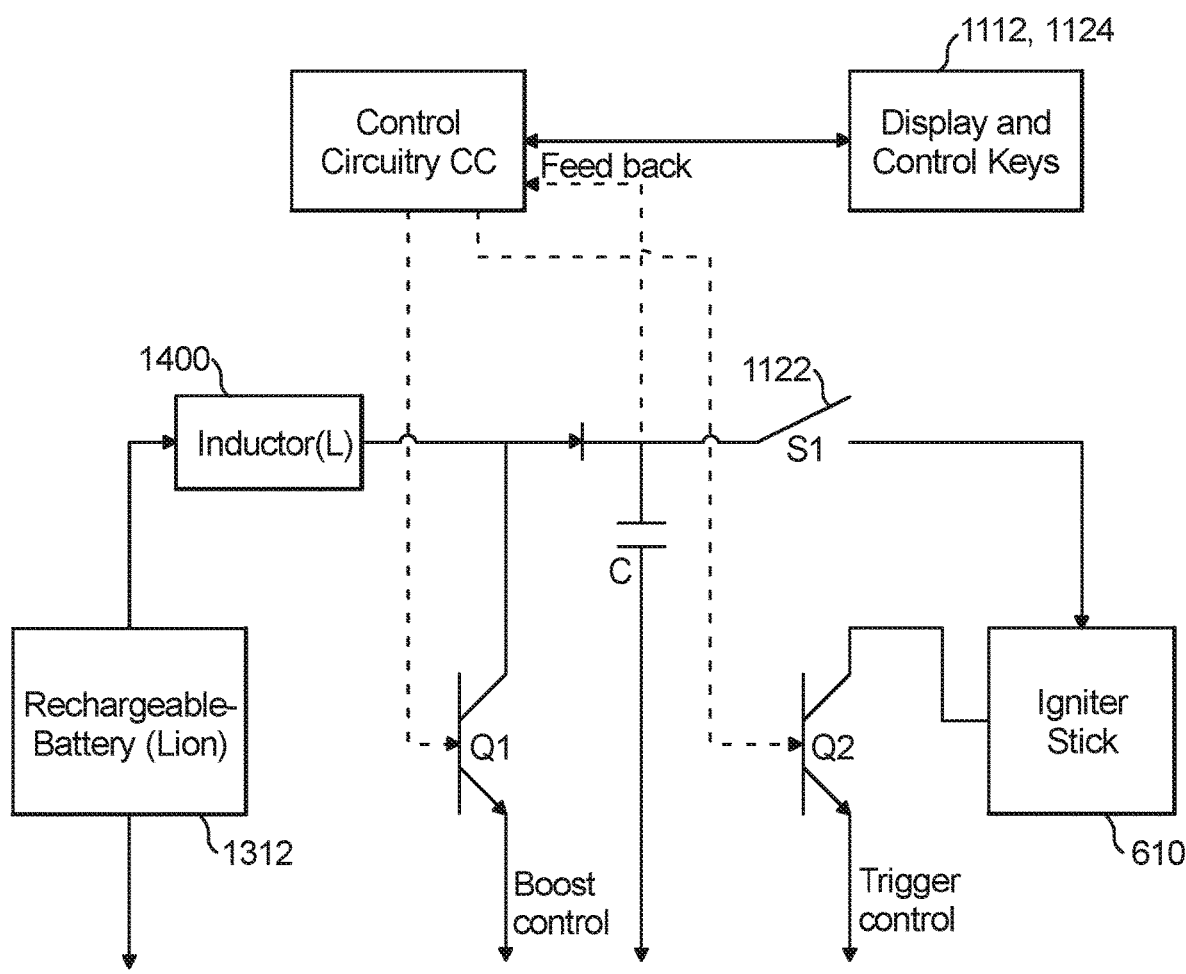
FIG. 30B illustrates the overall architecture for describing some working principles of the controller components, according to an exemplary embodiment of the present disclosure.

Referring to FIG. 30B, an exemplary embodiment of an overall architecture for describing some working principles of the controller components 1300 of the programmable ignitor 1100 according to the present disclosure is shown. The programmable ignitor 1100 may be powered by a voltage source 1312 which, for example, may be one or more rechargeable batteries. After the programmable ignitor 1100 is powered on using the ON/OFF switch 1115, seen in FIG. 29, an inductor 1400 and boost control transistor Q1, which are part of the Boost converter 1306, together charge capacitor C to a defined voltage. This voltage is determined by the microprocessor 1320 based on the length of cable 140, seen in FIG. 1, which is input to the programmable ignitor 1100 by a user. Cables 140 of varying length may be utilized depending on the maximum extendable length of the pole 102. The length of the cable 140 is generally measured and determined with the coiled cable fully extended. The processor 1320 presents a ready message to the user utilizing display 1112. The control keypad 1124 is used to modify certain operating parameters including, for example, setting a timer, inputting the cable length information and to otherwise operate the controller circuitry. When the TRIGGER button 1126, seen in FIG. 29, is pressed, control circuitry (CC) including the processor 1320 begins a countdown of the timer. When the timer reaches zero, trigger control transistor (Q2), which is enabled by the control circuitry (CC), sends a voltage pulse to the ignitor box 608, seen in FIGS. 6 and 7, which causes the ignitor stick 610 to begin the exothermic reaction. A heavy-duty switch S1, e.g., safety switch 1122, functions as a safety switch. For example, when switch S1 is open, the programmable ignitor 1100 will not send a voltage pulse to the ignitor box 608 and thus the ignitor stick attached to the ignitor box. When switch S1 is closed, red LED light 1120 is lit indicating that the system is armed, and the programmable ignitor 1100 can send a voltage pulse to the ignitor box 608 to initiate an exothermic reaction when TRIGGER button is pressed and the timer counts down.

Flow diagrams describing the operation of programmable ignitor 1100 are shown in FIGS. 31-35 and referencing the enclosure 1110 shown in FIG. 29. Upon power-up of the programmable ignitor 1100 using the ON/OFF switch 1115 (Step S1, FIG. 31) a battery voltage determination is made (Step S2). If the battery voltage is low (e.g., equal to or below 1% remaining), a low battery red LED indicator light 1114 is activated (Step S4). The programmable ignitor 1100 is then automatically shut down (Step S6). If the battery voltage has less than or equal to 5% remaining but more than 1% remaining, an amber warning battery LED indicator light 1116 is activated (Step S8). If the battery has more than 5% remaining, the process enters a ready state (Step S10) waiting for user input (Step S12). If the Menu Timer button 1132 is pressed once (Step S14) the process proceeds to the Timer Menu flow shown in FIG. 32. If Menu Timer button 1132 is pressed twice in succession (Step S16), the process proceeds to the Program Menu flow shown in FIG. 33. If Trigger button 1126 is pressed, a determination is made whether the triggering Safety Switch 1122 is ON (Step S18). If the Safety Switch 1122 is OFF (Step S20) or the Esc/Abort button 1130 is pressed, the process returns to the ready state (Step S10) waiting for user input (Step S12). If Safety Switch 1122 is ON and timer is set to 0, the device is triggered (Step S22) and a voltage pulse signal is sent to the output connector 1140 through the cable 140 to the ignition box 608 to activate the ignitor stick 610, seen in FIGS. 8A and 8B, an initiate the exothermic reaction. As noted above, when the Safety Switch 1122 is on, the red LED indicator light 1120 is lit.

Figure 31:
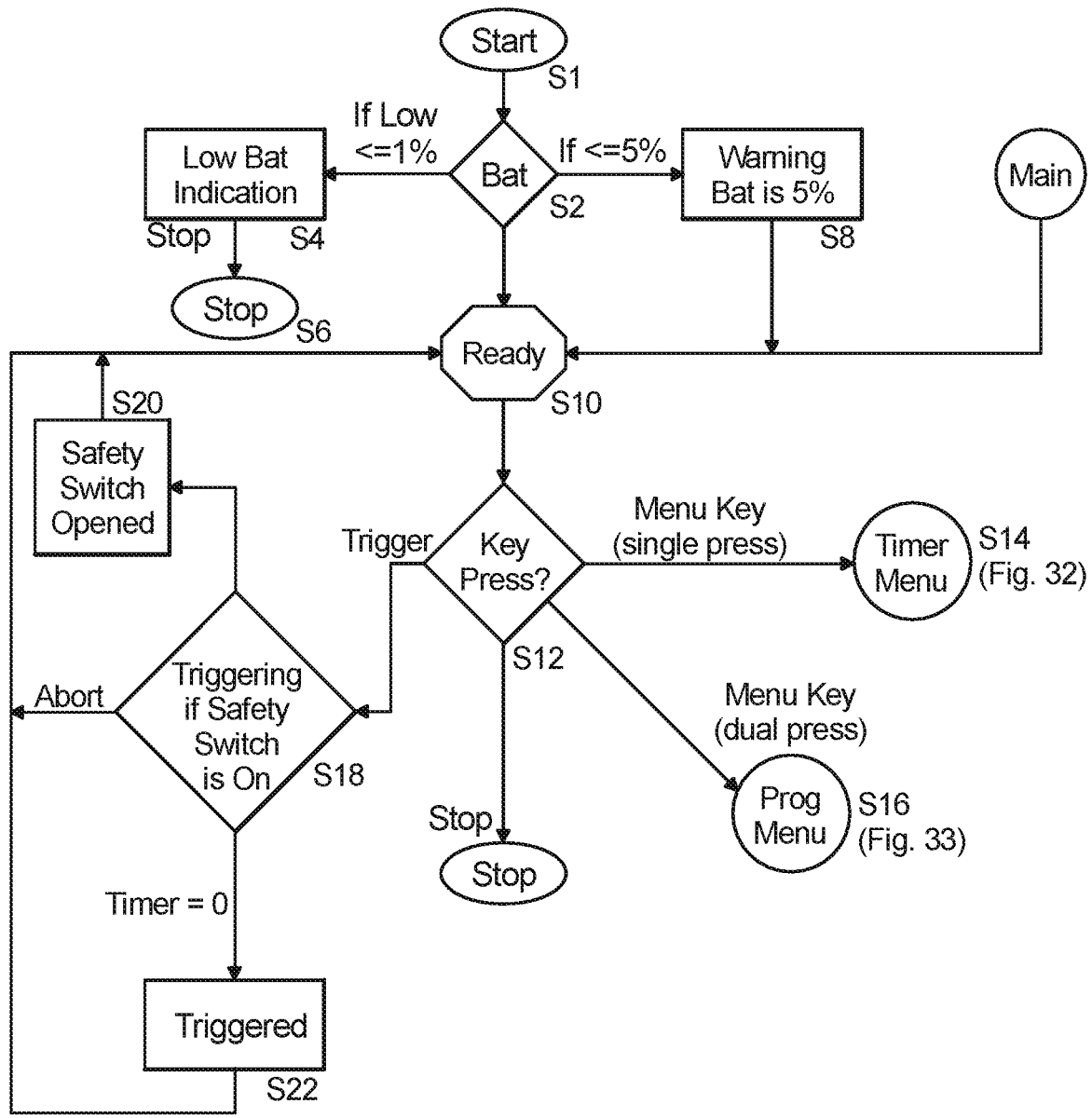
FIGS. 31-35 are flow diagrams for describing aspects of the processes performed by the controller according to various exemplary embodiments of the present disclosure.
Figure 32:
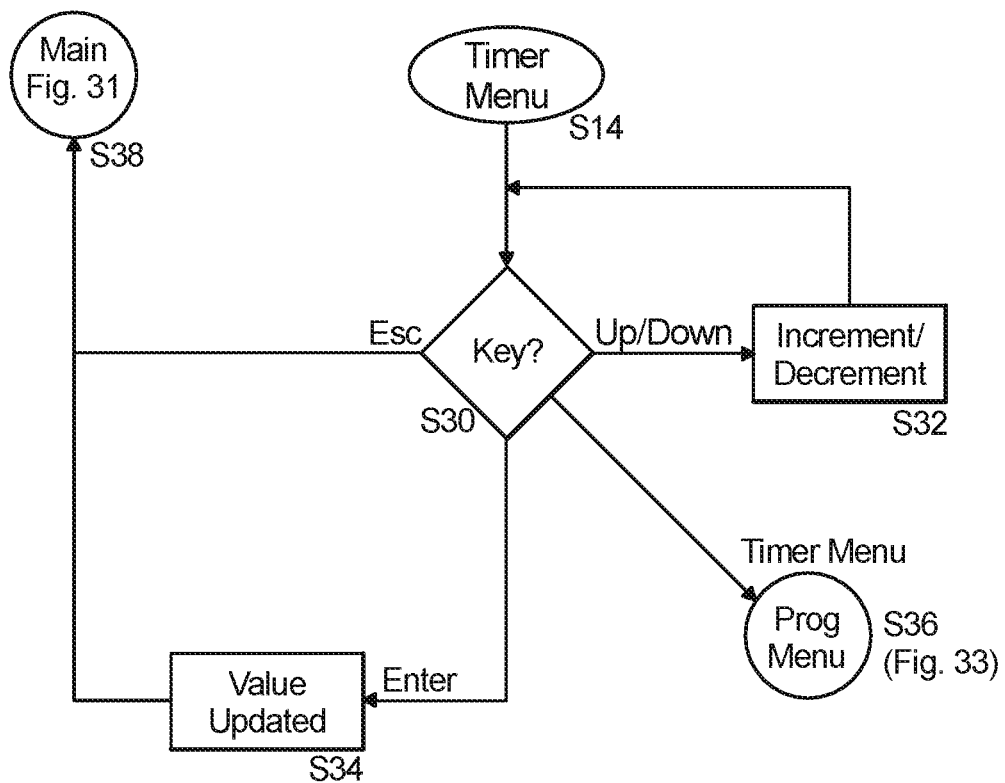

As shown in FIG. 32, if the Menu Timer button 1132 is pressed once (Step S14) the system waits for a key input (Step S30). If UP button 1128 or DOWN button 1136 is pressed, the time indicated in a timer setting shown on display 1112 is incremented or decremented accordingly (Step S32). For example, the timer setting may be set to 20 seconds by default. The user can then change the timer setting using UP button 1128 and DOWN button 1136. If the user is satisfied with the timer setting displayed, pressing the ENTER button 1134 will set the timer to that value (Step S34). If Menu Timer button is pressed twice in succession (Step S36), the process proceeds to the program flow shown in FIG. 33. If the ESCAPE/ABORT button 1130 is pressed, the process proceeds (Step S38) to the Main flow Ready state shown in FIG. 31.

Figure 33:
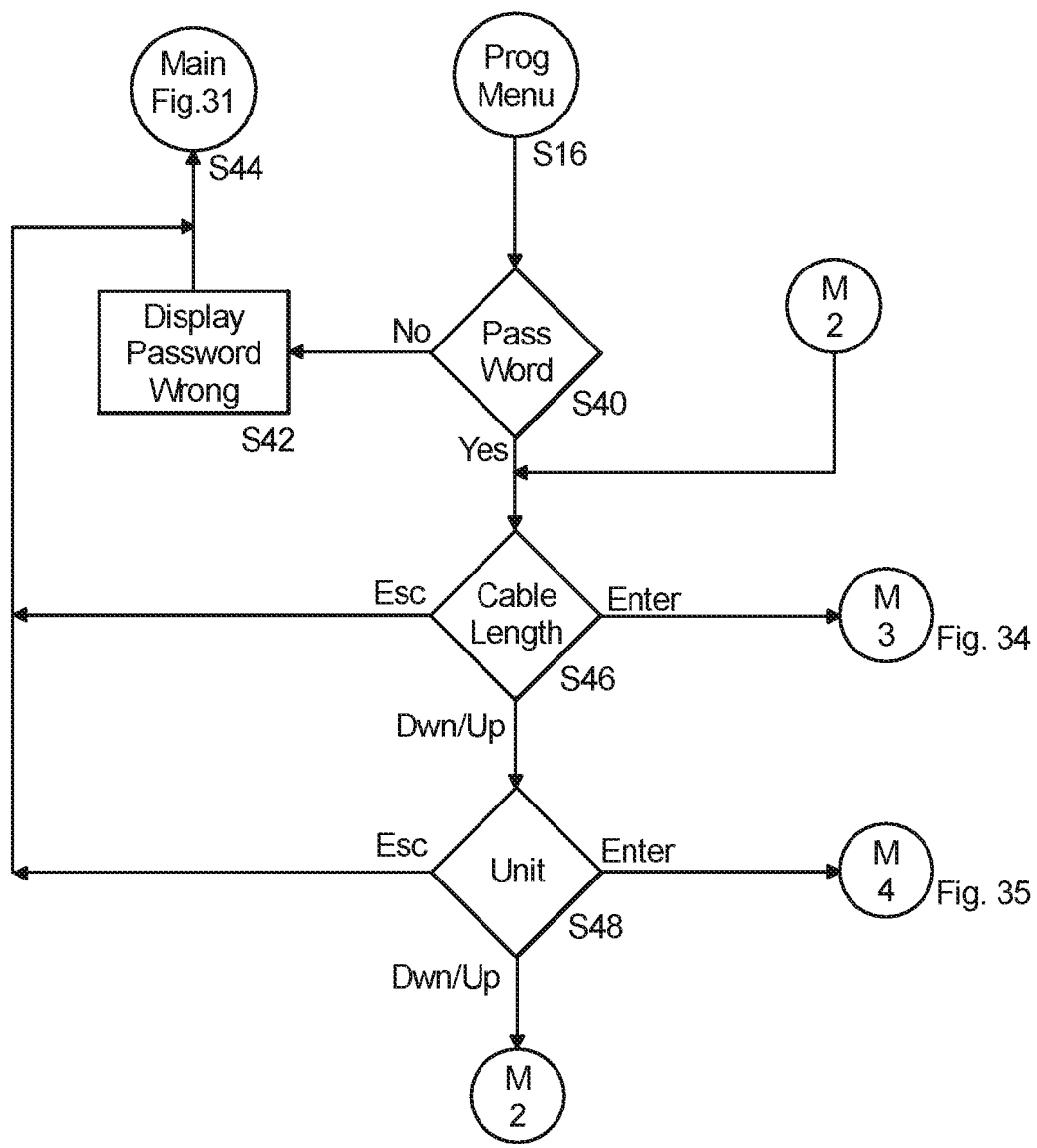
Figure 34:
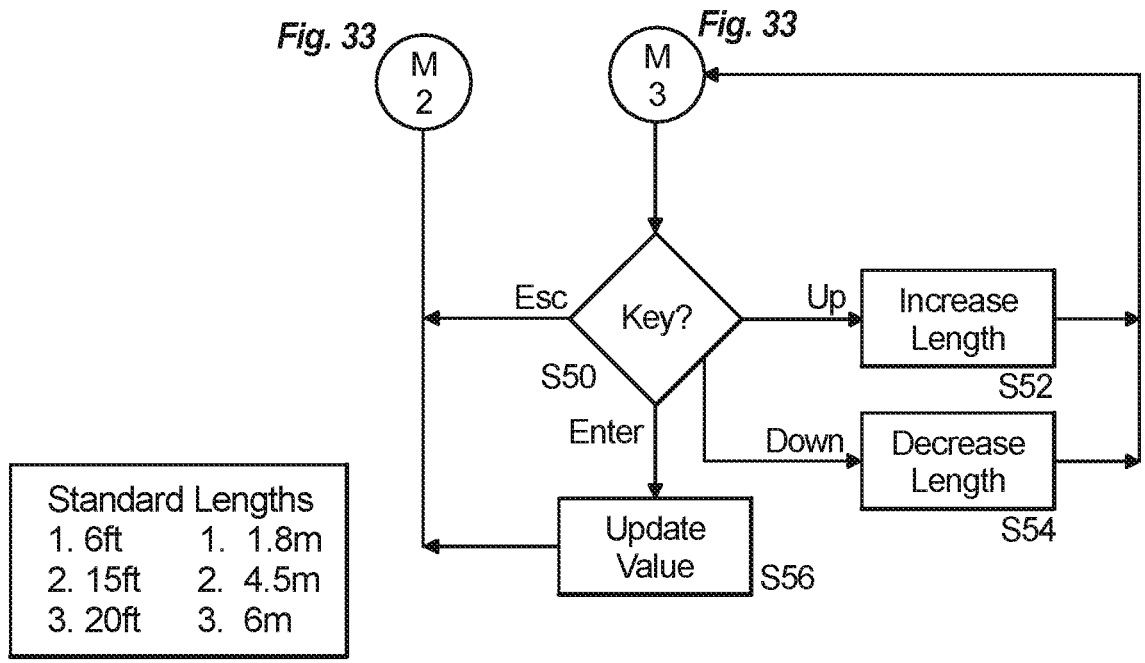
Figure 35:
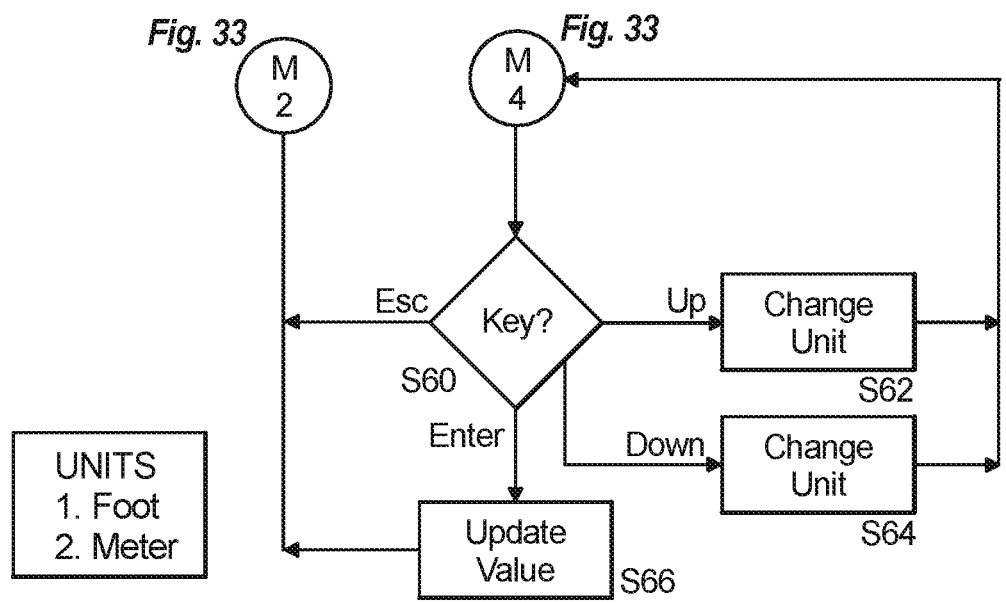

As shown in FIG. 33, when the program menu mode Step S16 is entered, the user is prompted to enter a password (Step S40). For example, the password may be a specified sequential combination of buttons on control keypad 1124. If the entered password is not correct (No, Step S40), a message is displayed to the user that the password is wrong (Step S42). The flow then proceeds to the main program flow (e.g., the Ready state S10 (FIG. 31). If the entered password is correct (Yes, Step S40), the user is given the option to enter the length of the cable 140 that is being utilized. For example, pressing the ENTER button 1134, the process proceeds to process M3 in FIG. 34 waiting for a key input (Step S50). If the user presses the UP button 1128, the cable length is increased each time the UP button is pressed (e.g., from 6 feet to 15 feet to 20 feet or from 1.8 meters to 4.5 meters to 6 meters) (Step S52). If the user presses the DOWN button 1136, the cable length is decreased (e.g., from 20 feet to 15 feet to 6 feet or from 6 meters to 4.5 meters to 1.8 meters) (Step S54). Pressing the ENTER button 1134, the cable length value is updated and stored (Step S56) and the process returns to process M2 in FIG. 33. Pressing the UP button 1128 or the DOWN button 1136 at this time will then let the user change the units of measurement of the cable (Step S48). Pressing the ENTER button 1134, the process proceeds to process M4 in FIG. 35 waiting for a key input (Step S60). If the user presses the UP button 1128, the units are changed from Feet to Meters (Step S62). Pressing the DOWN button 1136, the units are changed from Meters to Feet (Step S64). Pressing the ENTER button 1134, the Units Value is updated and stored (Step S66). The process then returns to process M2 (FIG. 33). Pressing the Escape/Abort button at Steps S46, S48 will return the user to the main ready state in FIG. 31 (Step S10).

Figure 40:
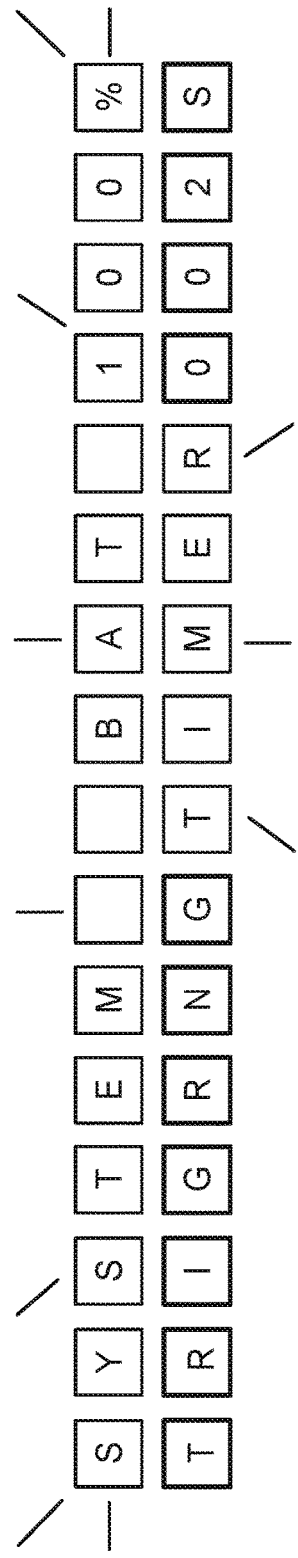
Figure 41:
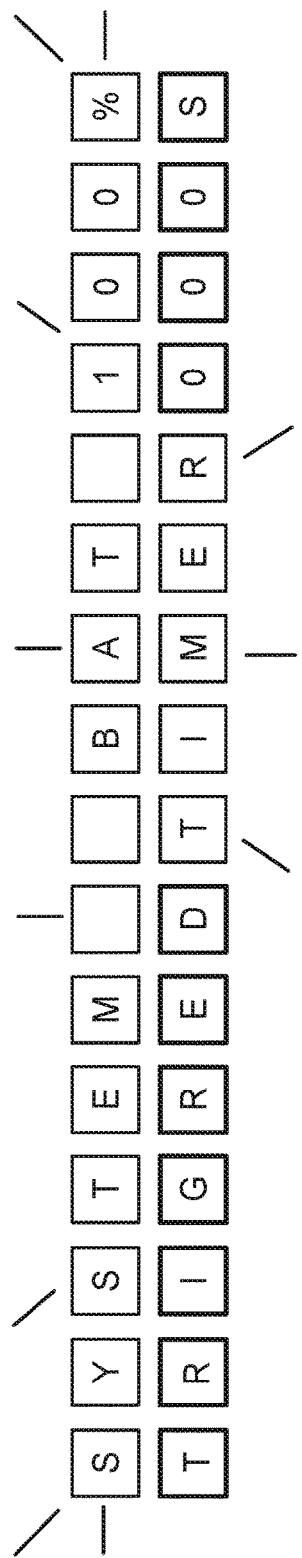
Figure 42:
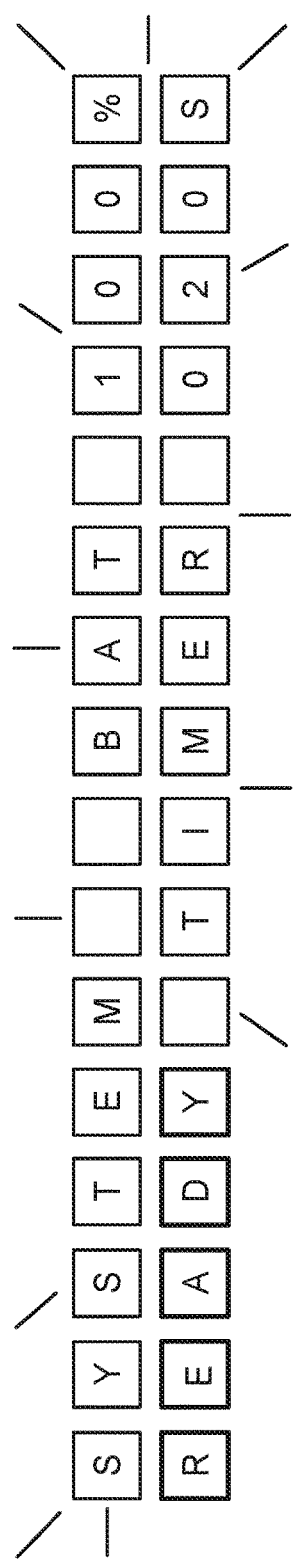
Figure 43:
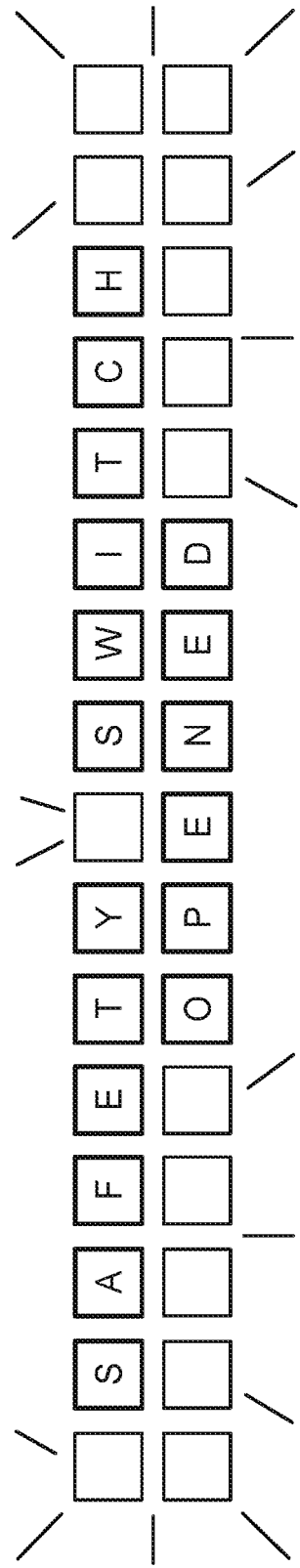
Figure 44:
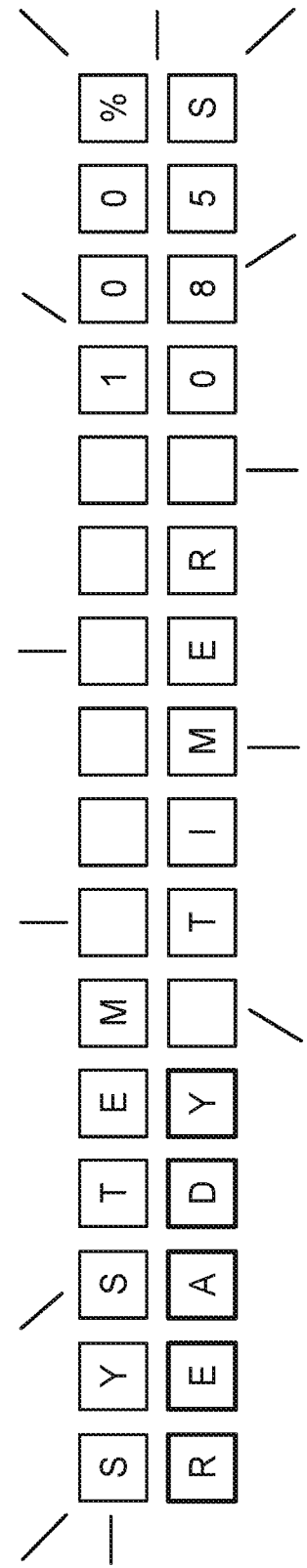

Referring now to FIGS. 36-54 and referencing the enclosure 1110 shown in FIG. 29, exemplary display states or information that the programmable ignitor 1100 may presented to a user via the display 1112 are shown. According to the exemplary embodiment shown, the portions of the display shown in bold boxes represent blinking characters. When the power switch 1115 is turned on, the message shown in FIG. 36 can be displayed to the user (State 1). After a predetermined amount of time (e.g., 5 seconds), the message shown in FIG. 37 is displayed to the user (State 2). In this example, the message indicates that the battery has 100% remaining and that the timer is set for 85 second delay. The user then has several options. By pressing the MENU/TIMER button 1132 and then using the UP button 1128 or DOWN button 1136, the user can modify the timer value in predefined intervals, e.g., in 5 second intervals. During this time, the display may look as shown in FIG. 38 (State 3), where a timer value of for example 20S is blinking. Pressing the ESCAPE button 1130 at this time will return to the display to State 2 shown in FIG. 37. After the timer is set to the appropriate delay time, the user presses the ENTER button 1134 and the timer value stored in memory is updated. The message shown in FIG. 39 is then displayed to the user (State 1, updated with the new timer value). When the user presses TRIGGER button 1126, the countdown timer as shown in FIG. 40 will be displayed (TRIGRNG and 002S will start to blink) and the timer count down will start. When the timer reaches zero, the trigger signal is output by the control unit, here the programmable ignitor and the message shown in FIG. 41 is displayed to the user (Trigred and 000S will blink). After a predetermined amount of time (e.g., 5 seconds) the system will then enter the ready condition and the message shown in FIG. 42 will be displayed (READY will blink). If the user presses the Escape/Abort button 1130 during the timer countdown, the timer countdown is aborted and the message shown in FIG. 45 (State 6) is displayed (ABORTED will blink). After a predetermined amount of time (e.g., 5 seconds) the system will enter the ready condition and the message shown in FIG. 46 (State 1) is displayed. If the user presses TRIGGER button 126 while safety switch 122 is OFF, the message shown in FIG. 43 is displayed (SAFETY SWITCH OPENED will blink). After a predetermined amount of time (e.g., 5 seconds), the message shown in FIG. 44 is displayed (State 1). If the remaining power level falls to between 5% and 1%, the message shown in FIG. 47 is displayed (State 7) ("BAT" and "004%" will blink). This is a warning to the user that the battery life is almost done. In addition, as noted above, the amber LED 1116 may also light. However, the user can continue with the trigger operation. When the remaining power level falls to 1%, the message shown in FIG. 48 is displayed (State 8) (01% and LOW BAT will blink at a faster rate). In addition, as noted above, the red LED 1114 may also light. During this time, no keys will work and no triggering operation can occur until new batteries are installed.

Programming of the control unit, e.g., the programmable ignitor, can be performed when the system is in the READY condition (State 1). When the MENU button 1132 is pressed one time, a Timer message such as that shown in FIG. 49 will be displayed (State 9). By pressing the UP button 1128 and the DOWN button 1136, the user can change the displayed timer in predefined intervals, e.g., in 5 second intervals. Pressing the ENTER key 1134, from the screen shown in FIG. 49, the system will prompt the user to enter a password with the message shown in FIG. 50 (State 10). For example, the password may be set to any sequence of keys Up—Down—Esc and Enter, in any combination. If the password is entered correctly by the user, the message shown in FIG. 51 is displayed (State 11) showing the presently set cable length. Pressing ENTER button 1134 displays the message shown in FIG. 52 (State 12), allowing the user to set the length of the cable being utilized. The lengths are predetermined values and may be, for example, 3 ft., 6 ft., 7 ft., 15 ft. and 20 ft. (or 1.8 m, 4.5 m and 6 m if in metric). Pressing the Up button 1128 or the Down button 1136 will cycle through the predetermined values. When the proper length is displayed, pressing the Enter button 1134 will update and stored the set cable length in memory and the message displayed will return to FIG. 51 (State 11) displaying the newly updated value. The predetermined cable length values can be changed in the source code if desired. It should be noted that pressing the Escape/Abort button 1130 always moves the display to the previous display without updating any values. Updated values will remain in memory until modified. Pressing the Up button 1128 or Down button 1136 when the message in FIG. 51 (State 11) is being displayed, the user is given the option to change the units of cable length by displaying the message shown in FIG. 53 (State 13). Pressing Enter button 1134, the display will show the message depicted in FIG. 54 (State 14). Pressing the UP button 1128 or DOWN button 1136 will then cycle through the predetermined units that can be selected for the cable length (e.g., FEET, INCHES, METERS, CENTERMETERS). Pressing the ENTER button 1134 will update the memory with the selected unit. If desired, the predetermined units can be changed in the source code. Pressing the Enter button 1134 will then return the display to the ready State 1 display.

In certain illustrative embodiments described herein, the ignitor 104 may be constructed from metal (e.g., stamped steel, spring steel), plastic (e.g., polycarbonate or nylon) or a combination of such materials. Alternatively, steel, brass, aluminum or other appropriate alloy may be used for the appropriate components. Of course, other types of materials such as other types of plastics, composites, etc. may be used as desired and where appropriate.

It will be appreciated that various types of mold assemblies may be utilized. For example, exothermic reaction molds may be connected to telescoping pole 102 for performing different types of welding including welding cabling to horizontal, vertical, flat, and/or rounded surfaces, cable to cable connections, cable to rebar connections, etc.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A tool assembly for performing operations in confined spaces, the tool assembly comprising:
    a telescoping pole including a proximal end and a distal end and capable of extending between a retracted position and an extended position;
    an exothermic welding assembly, the exothermic welding assembly mounted at the distal end of the pole and comprising an exothermic mold assembly and ignitor box, wherein the exothermic mold assembly comprises:
        an upper portion forming a crucible and having an orifice for receiving one end of an ignitor stick; and
        a lower portion having a lower surface for contacting a surface of a structure to be welded, a notch in the lower surface for receiving a cable to be welded to the structure, and a clip positioned in vicinity of the notch for holding the cable during welding;
    a control unit connected to the proximal end of the telescoping pole; and
    a flexible cable extending through the telescoping pole from the exothermic mold assembly to the control unit.

2. The tool assembly as recited in claim 1, wherein the control unit comprises a remote ignition unit.

3. The tool assembly as recited in claim 2, wherein the remote ignition unit comprises a remote switch.

4. The tool assembly as recited in claim 2, wherein the remote ignition unit comprises a programmable ignition unit capable of being programmed to set an ignition delay timer.

* * * * *